United States Patent
Kiyota

(10) Patent No.: US 9,432,634 B2
(45) Date of Patent: Aug. 30, 2016

(54) IMAGE GENERATION DEVICE AND OPERATION SUPPORT SYSTEM

(71) Applicant: SUMITOMO HEAVY INDUSTRIES, LTD., Tokyo (JP)

(72) Inventor: Yoshihisa Kiyota, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 540 days.

(21) Appl. No.: 13/858,148

(22) Filed: Apr. 8, 2013

(65) Prior Publication Data

US 2013/0222594 A1 Aug. 29, 2013

Related U.S. Application Data

(63) Continuation of application No. PCT/JP2011/075443, filed on Nov. 4, 2011.

(30) Foreign Application Priority Data

Nov. 16, 2010 (JP) ................. 2010-256295

(51) Int. Cl.
*H04N 7/18* (2006.01)
*G06T 3/40* (2006.01)

(52) U.S. Cl.
CPC ............. *H04N 7/181* (2013.01); *G06T 3/4038* (2013.01); *H04N 7/183* (2013.01)

(58) Field of Classification Search
CPC ..... H04N 7/181; H04N 7/183; G06T 3/4038
See application file for complete search history.

(56) References Cited

U.S. PATENT DOCUMENTS

| 7,511,734 | B2 | 3/2009 | Ozaki | |
|---|---|---|---|---|
| 2002/0114072 | A1* | 8/2002 | Hong | G02B 27/2207 359/464 |
| 2007/0085901 | A1 | 4/2007 | Yang et al. | |
| 2010/0194886 | A1* | 8/2010 | Asari et al. | 348/148 |
| 2011/0267366 | A1 | 11/2011 | Ichinose | |

FOREIGN PATENT DOCUMENTS

| JP | 2002-019556 | 1/2002 |
|---|---|---|
| JP | 2002-166802 | 6/2002 |
| JP | 2002-354468 | 12/2002 |
| JP | 2006-048451 | 2/2006 |
| JP | 2007-109166 | 4/2007 |

(Continued)

OTHER PUBLICATIONS

International Search Report mailed on Feb. 7, 2012.

(Continued)

*Primary Examiner* — Tat Chio
(74) *Attorney, Agent, or Firm* — IPUSA, PLLC

(57) ABSTRACT

An image generation device generates an output image including a road image based on plural input images that are captured by plural cameras mounted to a body to be operated. The image generation device includes a control part that arranges input image portions of two cameras that correspond to an overlapping area of the image capturing ranges of the two cameras to form a lattice pattern on the output image. The lattice pattern includes as a unit pattern a region that is defined by two circles having a center at the position of a first camera of the two cameras and two circles having a center at the position of a second camera of the two cameras.

2 Claims, 24 Drawing Sheets

(56) References Cited

FOREIGN PATENT DOCUMENTS

| | | |
|---|---|---|
| JP | 2008-095307 | 4/2008 |
| JP | 2008-248613 | 10/2008 |
| JP | 2009-171537 | 7/2009 |
| JP | 2009-202689 | 9/2009 |
| JP | 2010-204821 | 9/2010 |
| JP | 2010-219587 | 9/2010 |

OTHER PUBLICATIONS

Checker shadow illusion (Edward H. Adelson, "Checker shadow illusion," 1995 <http://web.mit.edu/persci/people/adelson/checkershadow_illusion.html>).

* cited by examiner

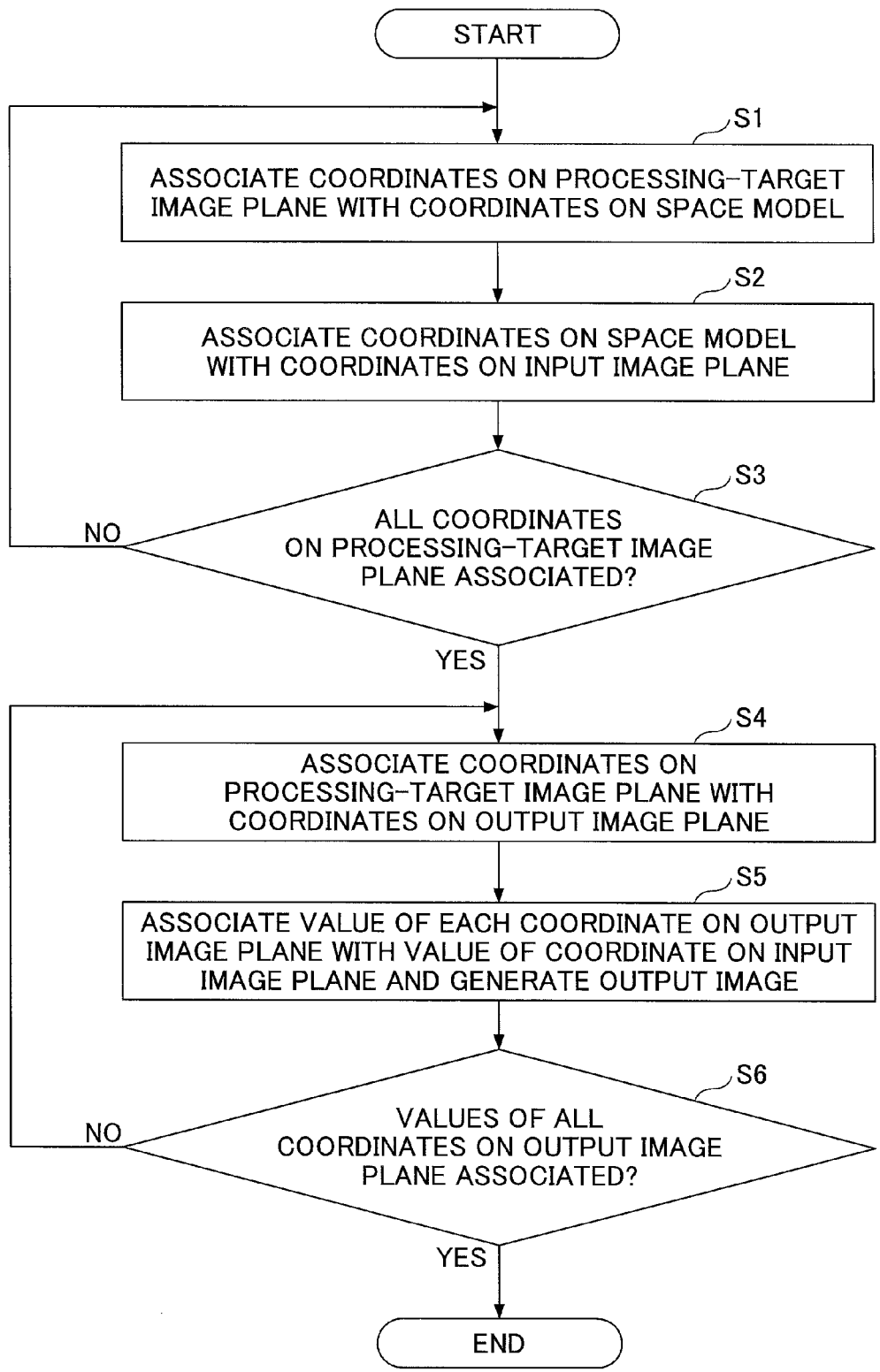

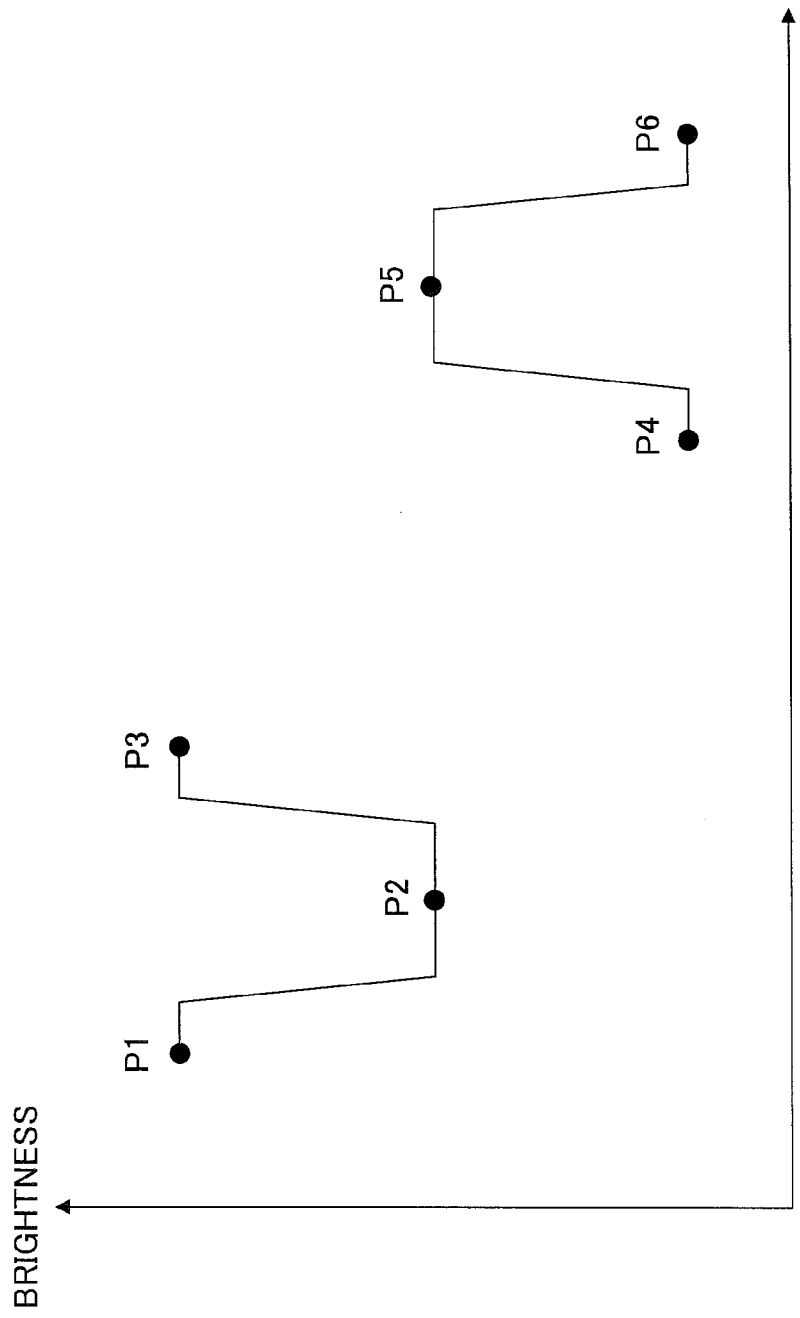

FIG.16
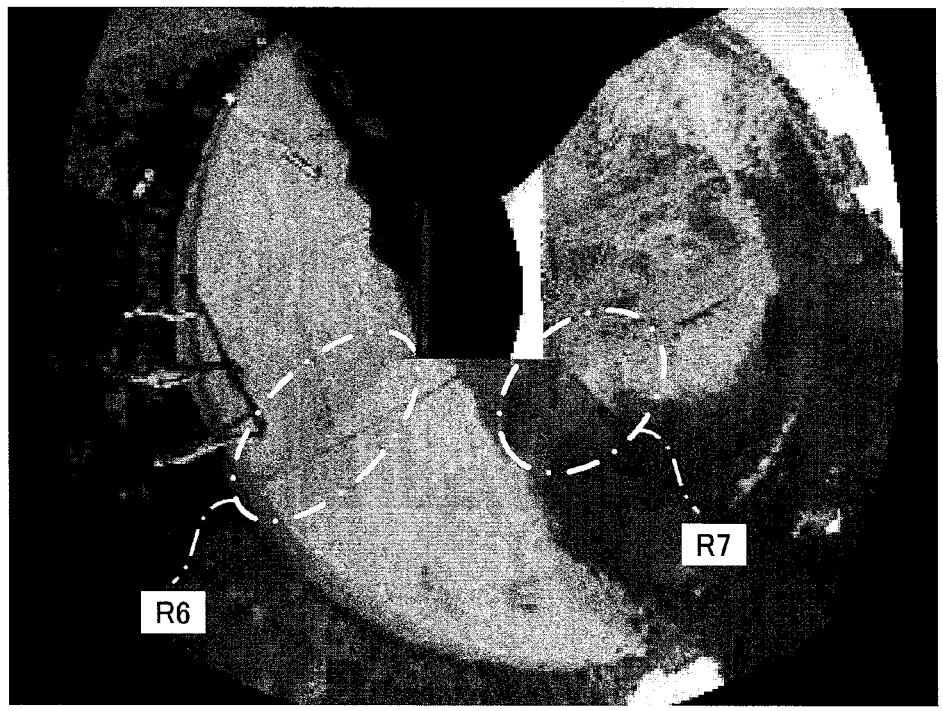
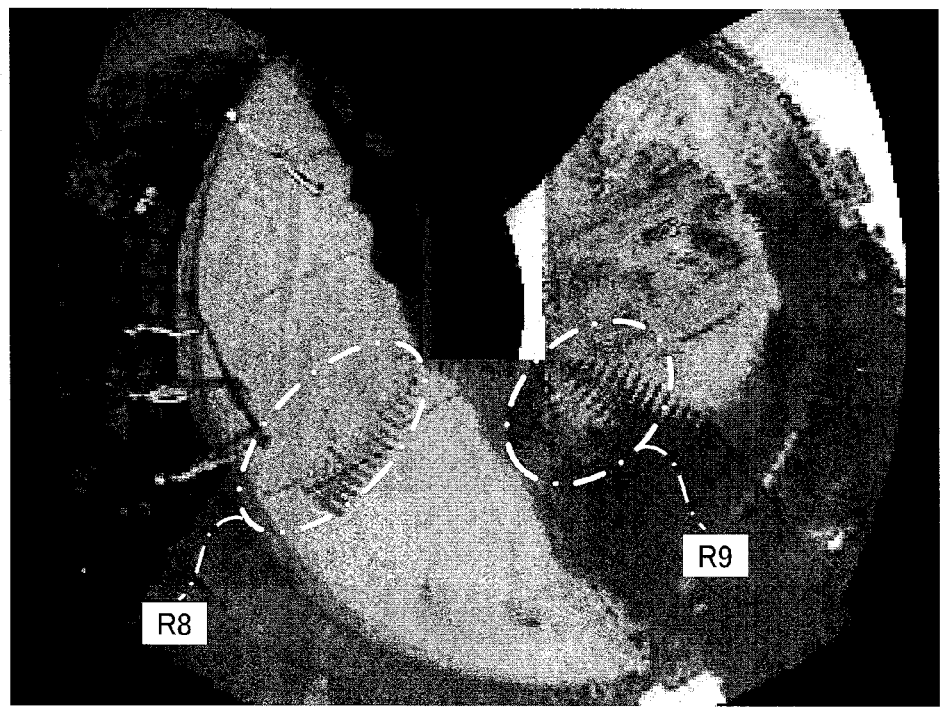

FIG.19
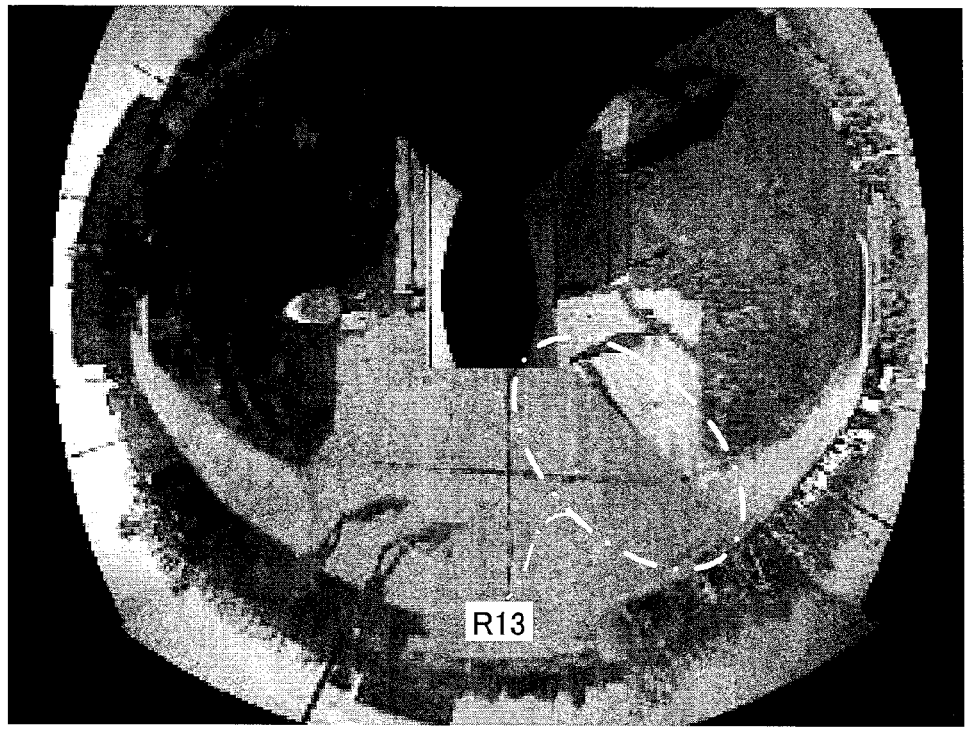
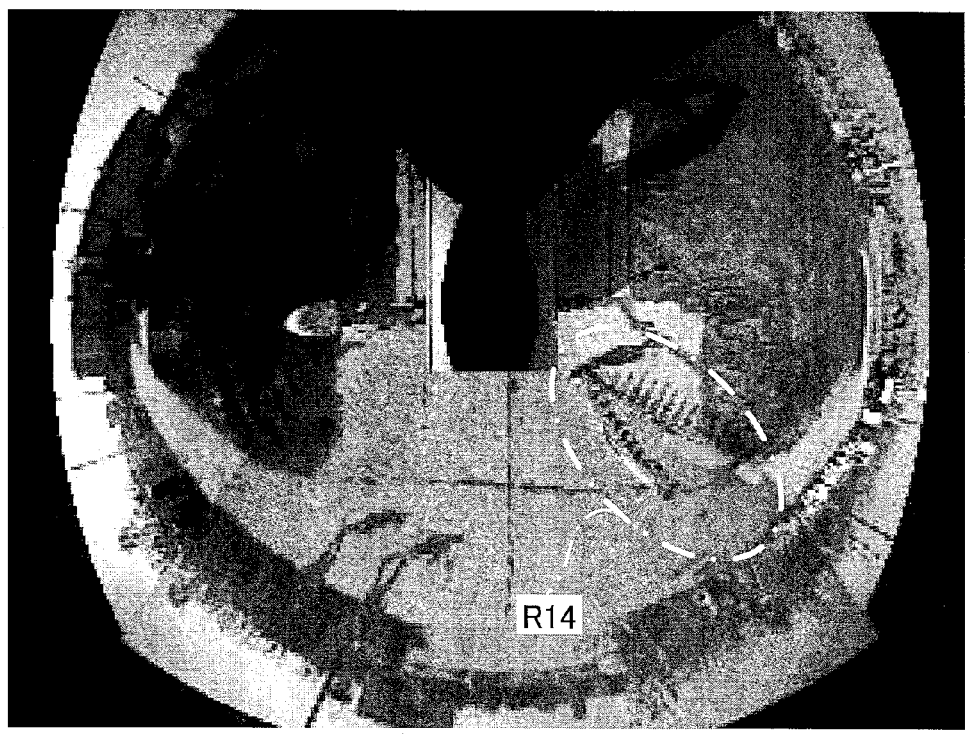

IMAGE GENERATION DEVICE AND OPERATION SUPPORT SYSTEM

CROSS-REFERENCE TO RELATED APPLICATIONS

The present application is a continuation application filed under 35 U.S.C. 111(a) claiming benefit under 35 U.S.C. 120 and 365(c) of International Application PCT/JP2011/075443, filed on Nov. 4, 2011, designating the U.S., which claims priority to Japanese Patent Application No. 2010-256295, filed on Nov. 16, 2010. The entire contents of the foregoing applications are incorporated herein by reference.

FIELD

The present invention relates to an image generation device that generates an output image based on plural input images captured by plural cameras that are mounted on a body to be operated, and an operation support system using such a device.

BACKGROUND

A driving assistance system is known that converts images of vehicle surroundings captured by plural imaging devices installed in a vehicle into bird's-eye view images, composites the bird's-eye view images to generate an output image, and presents the generated output image to an operator of the vehicle (See, e.g., Japanese Unexamined Patent Publication No. 2007-109166).

The disclosed driving assistance system generates an overlapping area image of an overlapping area of image capturing ranges of two cameras by setting a convoluted comb-like boundary line dividing the overlapping area image into two, and compositing the two bird's eye view images captured by the two cameras by alternately arranging the respective partial areas of the two bird's eye view images along the comb-like boundary.

Ordinarily, an object with a height that is located within the overlapping area is projected on two directions extending along the direction of two lines connecting the two cameras to the object. When the overlapping area is divided into two areas by one straight line and one bird's-eye view image captured by one of the cameras is used for one of the divided areas while the other bird's-eye view image captured by the other camera is used for the other divided area, the object may disappear from the overlapping area image.

In this regard, by compositing the images in the manner described above, the disclosed driving assistance system can prevent such an object with a height from disappearing from the overlapping area image and can facilitate recognition of the object by an operator.

The driving assistance system disclosed in Japanese Unexamined Patent Publication No. 2007-109166 uses a convoluted comb-like boundary line to composite two bird's eye view images by alternately arranging the respective partial areas of the two bird's eye view images to generate an output image. In a case where there is a wide discrepancy in the brightness of the two bird's eye view images, a noticeable comb-shaped light-dark pattern may be created, which results in the output image appearing unnatural to the operator viewing the output image.

SUMMARY

According to an embodiment of the present invention, an image generation device generates an output image including a road image based on plural input images that are captured by plural cameras mounted to a body to be operated. The image generation device includes a control part that arranges input image portions of two cameras that correspond to an overlapping area of the image capturing ranges of the two cameras to form a lattice pattern on the output image. The lattice pattern includes as a unit pattern a region that is defined by two circles having a center at the position of a first camera of the two cameras and two circles having a center at the position of a second camera of the two cameras.

BRIEF DESCRIPTION OF DRAWINGS

FIG. 9 is a flowchart illustrating process steps of a processing-target image generation process and an output image generation process;

FIG. 12B is a graph illustrating the same color illusion;

FIG. 16 shows the output image of FIG. 11 and an output image generated by applying the lattice pattern for bringing about a same color illusion on the output image of FIG. 11 to illustrate their difference;

FIG. 19 shows the output image of FIG. 17 and an output image generated by applying the lattice pattern for bringing about a same color illusion on the output image of FIG. 17 to illustrate their difference.

DESCRIPTION OF EMBODIMENT(S)

According to an aspect of the present invention, there is provided an image generation device and an operation support system using such a device that are configured to prevent an object located in an overlapping area of the image capturing ranges of plural cameras from disappearing from an output image generated based on the input images captured by these cameras and prevent differences in the brightness of input images from becoming noticeable in an output image.

In the following, embodiments of the present invention are described with reference to the accompanying drawings.

Figure 1:
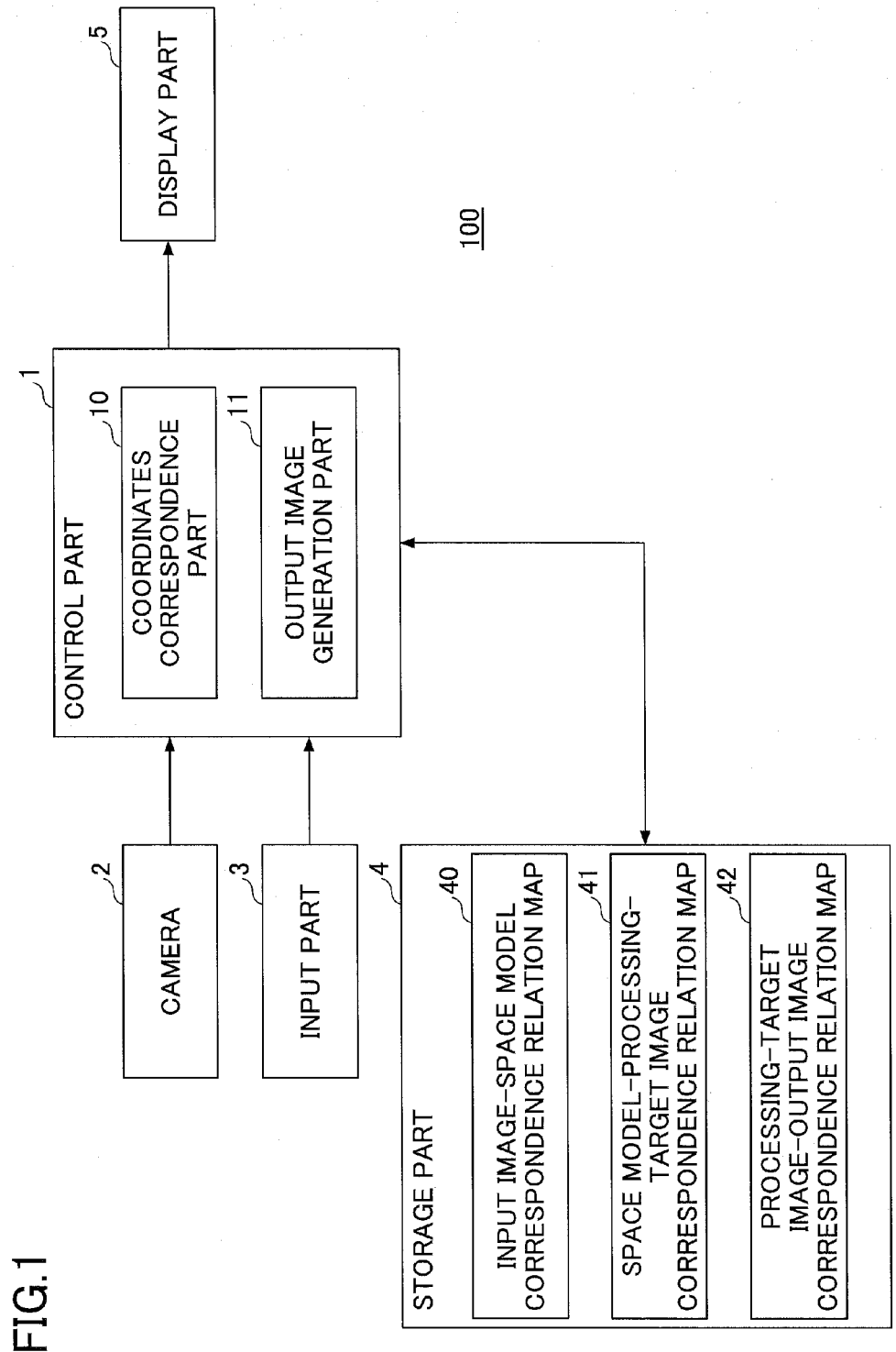
FIG. 1 is a block diagram schematically illustrating an exemplary configuration of an image generation device according to an embodiment of the present invention.

FIG. 1 is a block diagram illustrating an exemplary configuration of an image generation device 100 according to an embodiment of the present invention.

The image generation device 100 according to the embodiment generates, for example, an output image based on input images captured by a camera 2 mounted on a construction machine, and presents the output image to an operator. As illustrated in FIG. 1, the image generation device 100 includes a control part 1, the camera 2, an input part 3, a storage part 4 and a display part 5.

Figure 2:
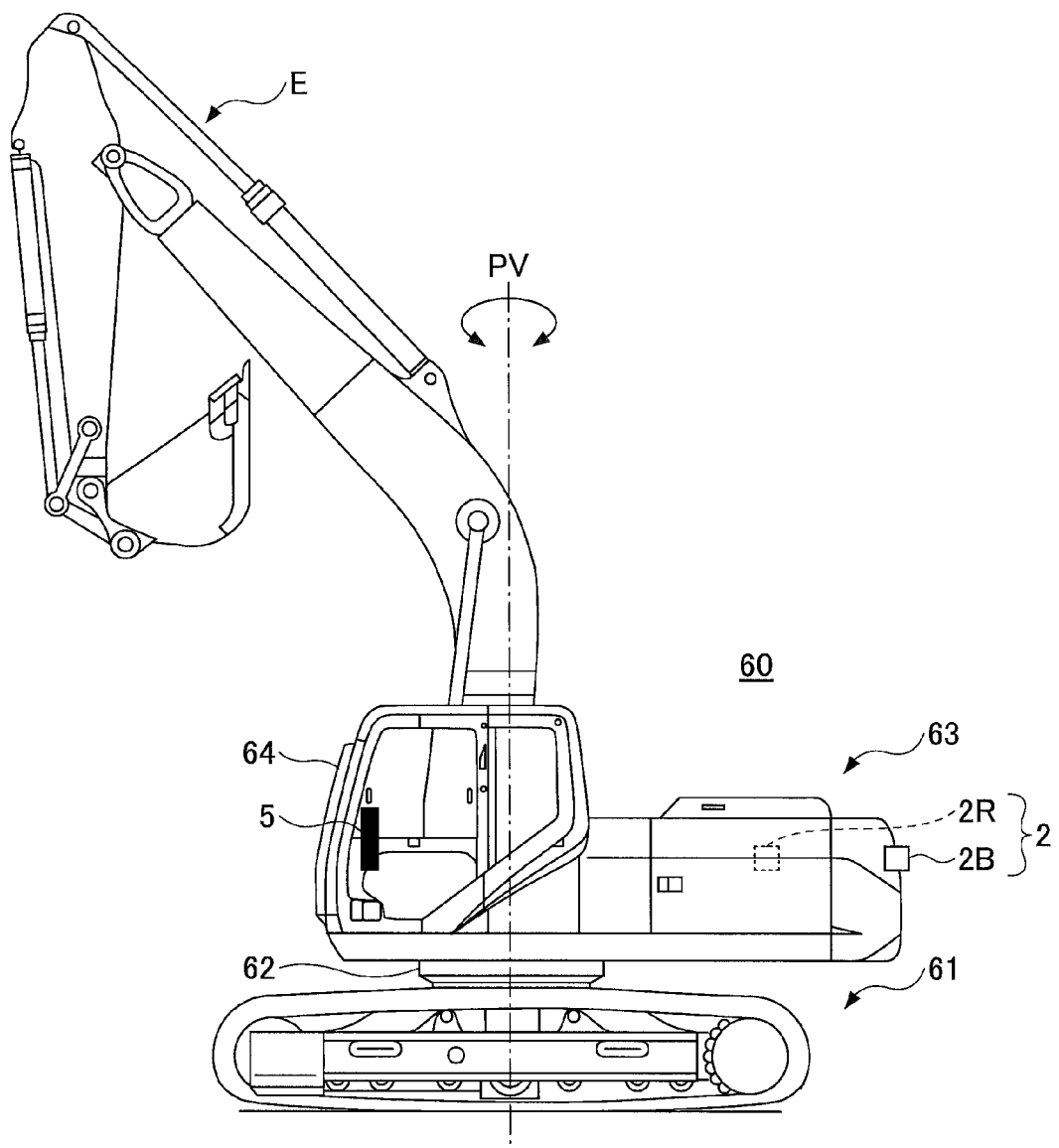
FIG. 2 is a side view of an excavator to which the image generation device is mounted.

FIG. 2 is a side view of an excavator 60 to which the image generation device 100 is mounted. The excavator 60 includes a lower-part running body 61 of a crawler type, a turning mechanism 61 and an upper-part turning body 63. The upper-part turning body 63 is mounted on the lower-part running body 61 via the turning mechanism 62 so as to be turnable about a tuning axis PV.

A cab (operation cabin) 64 is provided on a front left side part of the upper-part turning body 63, and an excavation attachment E is provided on a front central part. The cameras 2 (a right side camera 2R and a backside camera 2B) are provided on a right side face and a rear face of the upper-part turning body 63. The display part 5 is installed in the cab 64 at a position where the display part 5 can be easily viewed by an operator.

Next, component elements of the image generation device 100 are described.

The control part 1 includes a computer having a CPU (Central Processing Unit), a RAM (Random Access Memory), a ROM (Read Only Memory), an NVRAM (Non-Volatile Random Access Memory), etc. For example, programs corresponding to a coordinates correspondence part 10 and an output image generation part 11 described below may be stored in the ROM or the NVRAM, and the CPU may execute corresponding processes using the RAM as a temporary storage area.

The camera 2 is a device for acquiring an input image of the surroundings of the excavator 60, and includes a right side camera 2R and a backside camera 2B. The right side camera 2R and the backside camera 2B are attached to the right side surface and the rear surface of the upper-part turning body 63 so that, for example, an image of an area of a blind spot to the operator can be captured (see FIG. 2). Each of the right side camera 2R and the backside camera 2B is equipped with an image pick-up device, such as a CCD (Charge Coupled Device), a CMOS (Complementary Metal Oxide Semiconductor), etc. In other embodiments, the camera 2 may be mounted at positions other than the right side face and the rear face of the upper-part turning body 63 (e.g., front face and left side face), and may be equipped with a wide-angle lens or a fish-eye lens so that an image of a large range can be captured, for example.

The camera 2 acquires an input image according to a control signal from the control part 1, and outputs the acquired input image to the control part 1. In a case where the camera 2 acquires the input image using a fish-eye lens or a wide-angle lens, the camera 2 may output a corrected input image to the control part 1 in which an apparent distortion and/or tilting resulting from using these lenses are corrected. However, the camera 2 may alternatively output the acquired input image as is without correction. In such a case, the control part 1 corrects the apparent distortion and tilting.

The input part 3 is a device that enables an operator to input various items of information to the image generation device 100, and includes, for example, a touch panel, a button switch, a pointing device, a keyboard, etc.

The storage part 4 is a device for storing various items of information, and includes, for example, a hard disk, an optical disk, a semiconductor memory, etc.

The display part 5 is a device for displaying image information, and includes, for example, a liquid crystal display or a projector, which is installed in the cab 64 (see FIG. 2) of the construction machine. The display part 5 displays various images output by the control part 1.

Further, the image generation device 100 may generate a processing-target image based on an input image, apply an image conversion process to the processing-target image to generate an output image that enables intuitive perception of a distance and positional relationship of a surrounding obstacle, and present such output image to the operator.

The "processing-target image" refers to an image generated based on an input image that may be subject to an image conversion process (e.g., a scale conversion, an affine conversion, a distortion conversion, a viewpoint conversion). For example, in the case of using an input image captured by a camera that captures an image of a ground surface from above which input image includes a horizontal image (e.g., sky part) owing to its wide view angle, the processing-target image may be an image suitable for image conversion that is obtained by projecting the input image onto a predetermined space model so that the horizontal image may not be displayed unnaturally (e.g., so that the sky part may not be treated as part of the ground surface) and re-projecting the projection image projected on the space model onto a different two-dimensional plane. It is noted that the processing-target image may be used as an output image as is without applying an image conversion process.

The "space model" refers to a target object on which an input image is projected, and includes at least a plane surface or a curved surface (e.g., a plane surface parallel to the processing-target image plane or a plane surface or curved surface that forms an angle with the processing-target image plane) other than a processing-target image plane, which is a plane surface on which the processing-target image is positioned.

It is noted that the image generation device 100 may generate an output image by applying an image conversion process to a projection image projected onto the space model without generating a processing-target image. Also, the projection image may be used as an output image as is without being subject to an image conversion process.

Figure 3A:
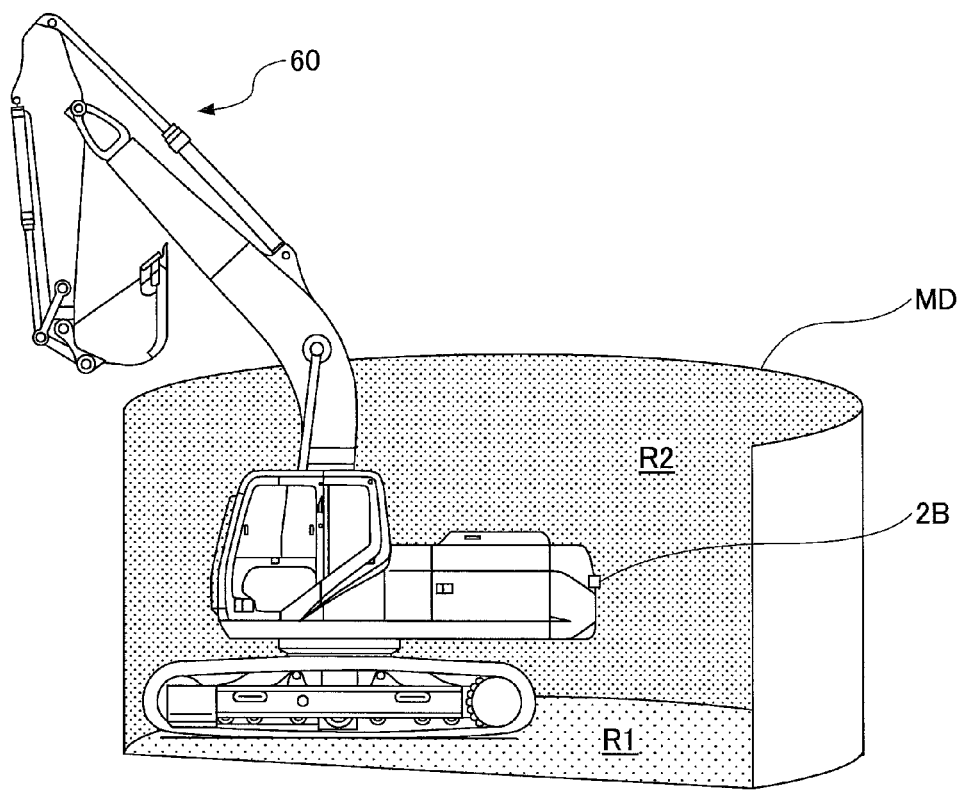
FIG. 3A is a side view of a space model to which an input image is projected.
Figure 3B:
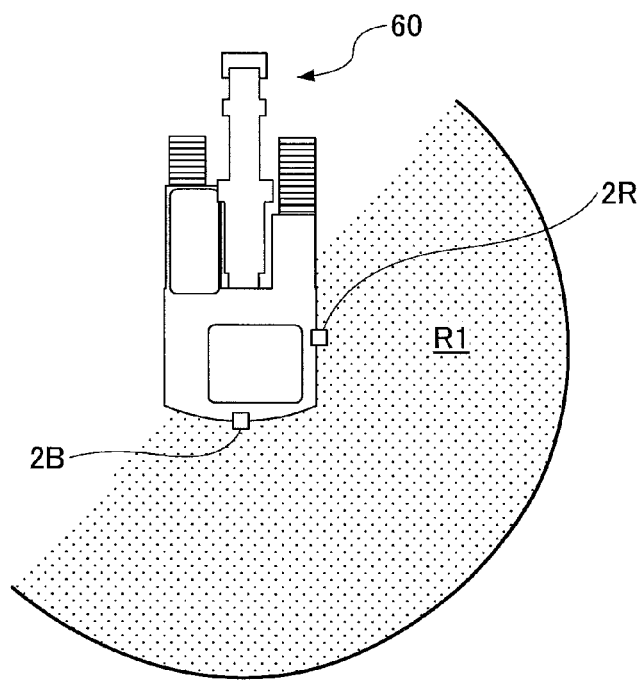
FIG. 3B is a plan view of the space model illustrated in FIG. 3A.

FIGS. 3A and 3B illustrate an exemplary space model MD on which an input image is projected. FIG. 3A illustrates a relationship between the excavator 60 and the space model MD when viewing the excavator 60 from a side, and FIG. 3B illustrates a relationship between the excavator 60 and the space model MD when viewing the excavator 60 from above.

As illustrated in FIGS. 3A and 3B, the space model MD is arranged into a half-cylindrical form. The space model MD includes a plane region R1 corresponding to a bottom inner face of the half-cylindrical form and a curved region R2 corresponding to an inner side face of the half-cylindrical form.

Figure 4:
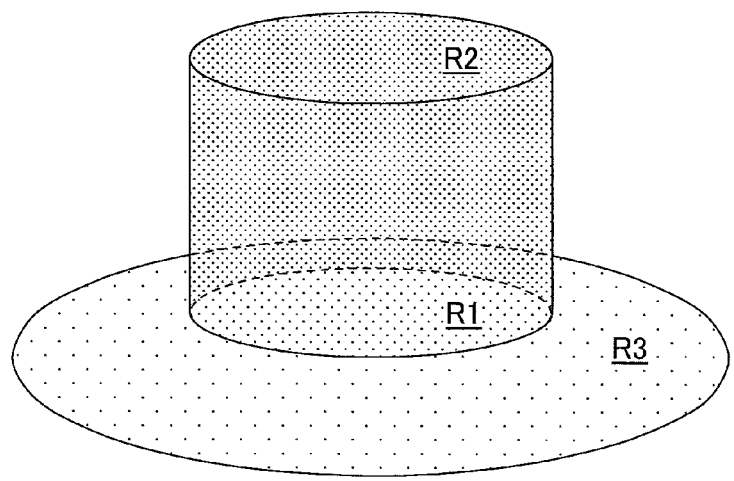
FIG. 4 is a perspective view illustrating a relationship between the space model and an image plane to be processed.

FIG. 4 illustrates an exemplary relationship between the space model MD and the processing-target image plane. In FIG. 4, the processing-target image plane R3 is a plane containing the plane region R1 of the space model MD. It is noted that the space model MD may be arranged into a cylindrical form as illustrated in FIG. 4, rather than a half-cylindrical form as illustrated in FIG. 3. That is, the form of the space model MD may be either half-cylindrical or cylindrical. This also applies to the illustrated examples described below. Also, the processing-target image plane R3 may be a circular area, which contains the plane region R1 of the space model MD, or may be an annular area, which does not contain the plane region R1 of the space model MD.

Next, the coordinates correspondence part 10 and the output image generation part 11 of the control part 1 are described.

The coordinates correspondence part 10 is configured to determine a correspondence between the coordinates on the input image plane on which the input image captured by the camera 2 is positioned (input coordinates), the coordinates on the space model MD (spatial coordinates), and the coordinates on the processing-target image plane R3 (projection coordinates). For example, the coordinates correspondence part 10 may determine the correspondence between the coordinates on the input image plane, the coordinates on the space model MD, and the coordinates on the processing-target image plane based on various parameters related to the camera 2, such as an optical center, a focal distance, a CCD size, an optical axis direction vector, a camera horizontal direction vector, a projection system, which parameters may be prescribed beforehand or input via the input part 3. The correspondence relationship is stored in the input image-space model correspondence relation map 40 and the space model-processing-target image correspondence relation map 41 of the storage part 4.

It is noted that in the case where the processing-target image is not generated, the coordinates correspondence part 10 omits the processes of determining the correspondence between the coordinates on the space model MD and the coordinates on the processing-target image plane R3 and storing the correspondence relationship in the space model-processing-target image correspondence relation map 41.

The output image generation part 11 is for generating an output image. For example, the output image generation part 11 may determine the correspondence between the coordinates on the processing-target image plane R3 and the coordinates on the output image plane on which the output image is positioned by applying a scale conversion, an affine conversion, or a distortion conversion to the processing-target image; store the correspondence relationship in a processing-target image-output image correspondence relation map 42 of the storage part 4; and generate an output image by referring to the values stored in the input image-space model correspondence relation map 40 and the space model-processing-target image correspondence relation map 41 by the coordinates correspondence part 10 to associate a value of each pixel in the output mage (e.g., a brightness value, a color phase value, a chroma value, etc.) with a value of each pixel in the input image.

Also, the output image generation part 11 may determine the correspondence between the coordinates on the processing-target image plane R3 and the coordinates on the output image plane on which the output image is positioned based on various parameters related to a virtual camera, such as an optical center, a focal distance, a CCD size, an optical direction axis vector, a camera horizontal direction vector, a projection system of the virtual camera, which parameters may be prescribed beforehand or input via the input part 3; store the correspondence relationship in the processing-target image-output image correspondence relation map 42 of the storage part 4; and generate an output image by referring to the values stored in the input image-space model correspondence relation map 40 and the space model-processing-target image correspondence relation map 41 by the coordinates correspondence part 10 to associate a value of each pixel in the output image (for example, a brightness value, a color phase value, a chroma value, etc.) with a value of each pixel in the input image.

It is noted that the output image generation part 11 may generate the output image by changing a scale of the processing-target image without using a concept of virtual camera.

Also, in the case where the processing-target image is not generated, the output image generation part 11 determines the correspondence between the coordinates on the space model MD and the coordinates on the output image plane according to the image conversion process applied. Then, the output image generation part 11 generates the output image by referring to the input image-space model correspondence relation map 40 to associate a value of each pixel in the output image (for example, a brightness value, a color phase value, a chroma value, etc.) with a value of each pixel in the input image while. In this case, the output image generation part 11 omits the processes of determining the correspondence between the coordinates on the processing-target image plane R3 and the coordinates on the output image plane and storing the correspondence relationship in the processing-target image-output image correspondence relation map 42.

Next, exemplary processes performed by the coordinates correspondence part 10 and the output image generation part 11 are described.

The coordinates correspondence part 10 may determine the correspondence between the input coordinates on the input image plane and the spatial coordinates on the space model using the Hamilton's quaternion, for example.

Figure 5:
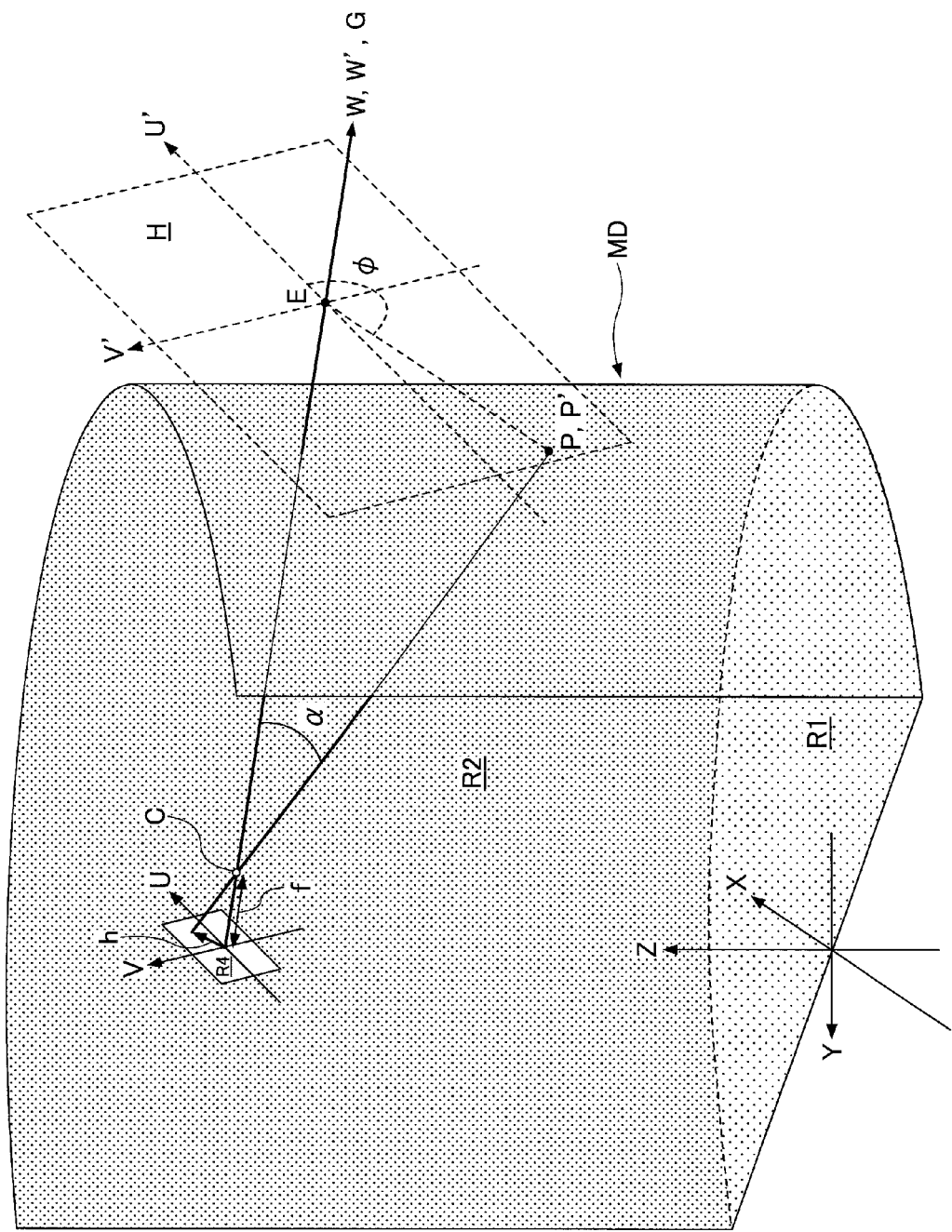
FIG. 5 illustrates a correspondence between coordinates on an input image plane and coordinates on a space model.

FIG. 5 is a diagram illustrating a correspondence between the coordinates on the input image plane and the coordinates on the space model. The input image plane of the camera 2 is expressed as a single plane having an optical center C of the camera 2 as an origin in a UVW rectangular coordinates system, and the space model is expressed as cubic planes in an XYZ rectangular coordinates system.

First, in order to convert the coordinates (coordinates of an XYZ coordinate system) on the space model into the coordinates (coordinates on the UVW coordinates system) on the input image plane, the XYZ coordinates system is rotated to cause the X-axis to be coincident with the U-axis, the Y-axis to be coincident with the V-axis, and the Z-axis to be coincident with the −W-axis after parallel-moving the origin of the XYZ coordinates system to the optical center C (origin of the UVW coordinates system). Here, the negative symbol "−" refers to a reverse direction. That is, in the UVW coordinates system, the +W direction represents the direction toward the front side of the camera, and in the XYZ coordinates system, the −Z direction represents a vertical downward direction.

If plural cameras 2 are provided, each of the cameras 2 has an individual UVW coordinates system. Thereby, the coordinates correspondence part 10 translates and rotates the XYZ coordinates system with respect to each of the plurality of UVW coordinates system.

The above-mentioned conversion is realized by translating the XYZ coordinates system so that the optical center C of the camera 2 becomes the origin of the XYZ coordinates system, and, thereafter, rotating the XYZ coordinates system so that the X-axis is coincident with the −W-axis and further rotating the XYZ coordinates system so that the X-axis is coincident with the U-axis. Therefore, the coordinates correspondence part 10 integrates the two rotations into a single rotation operation by describing the conversion by the Hamilton's quaternion.

It is noted that a rotation to cause a certain vector A to be coincident with a different vector B corresponds to a process of rotating by an angle formed between the vector A and the vector B using a normal line of a plane defined by the vector A and the vector B. When the rotating angle is denoted as θ, the angle θ is expressed by an inner product of the vector A and the vector B as follows.

$$\theta = \cos^{-1}\left(\frac{A \cdot B}{|A||B|}\right)$$ [Formula 1]

Also, the unit vector N of the normal line of the plane defined by the vector A and the vector B is expressed by an outer product of the vector A and the vector B as follows.

$$N = \frac{A \times B}{|A||B|\sin\theta}$$ [Formula 2]

Also, assuming i, j and k represent imaginary number units, the quaternion is a hypercomplex number satisfying the following condition.

$$ii=jj=kk=ijk=-1$$ [Formula 3]

In the present embodiment, the quaternion Q is expressed as follows, where a real component is denoted as t and pure imaginary components are denoted as a, b and c.

$$Q=(t;a,b,c)=t+ai+bj+ck$$ [Formula 4]

Therefore, the conjugate quaternion of the quaternion Q is expressed as follows.

$$Q^*=(t;-a,-b,-c)=t-ai-bj-ck$$ [Formula 5]

The quaternion Q can express a three-dimensional vector (a, b, c) by the pure imaginary components a, b and c while setting the real component t equal to 0 (zero). In addition, a rotating operation with an arbitrary vector as an axis can be expressed by each component t, a, b and c.

Further, the quaternion Q can express the consecutive plurality of numbers of rotating operation as a single rotation by integrating the rotating operations. For example, a point D (ex, ey, ez), which is an arbitrary point S (sx, sy, sz) rotated by an angle θ with an arbitrary unit vector C (l, m, n) as an axis, can be expressed as follows.

$$D = (0; ex, ey, ez) = QSQ^*$$ [Formula 6]

where, $$S = (0; sx, sy, sz), Q = \left(\cos\frac{\theta}{2}; l\sin\frac{\theta}{2}, m\sin\frac{\theta}{2}, n\sin\frac{\theta}{2}\right)$$

In the present embodiment, when the quaternion expressing a rotation, which causes the Z-axis to be coincident with the −W-axis, is Q, the point X on the X-axis in the XYZ coordinates system is moved to a point X'. Therefore, the point X' is expressed as follows.

$$X'=Q_z X Q_z^*$$ [Formula 7]

Also, in the present embodiment, when the quaternion expressing a rotation, which causes a line connecting the point X' on the X-axis and the origin to be coincident with the U-axis is Q, the quaternion R expressing a rotation to cause the Z-axis to be coincident with the −W-axis and further cause the X-axis to be coincident with the U-axis is expressed as follows.

$$R=Q_x Q_z$$ [Formula 8]

Based on the above, the coordinates P', when arbitrary coordinates P on the space model (XYZ coordinates system) is expressed by the coordinates on the input image plane (UVW coordinates system), is expressed as follows.

$$P'=RPR^*$$ [Formula 9]

Because the quaternion R is a constant of each of the cameras 2, the coordinates correspondence part 10 can convert the coordinates on the space model (XYZ coordinates system) into the coordinates on the input image plane (UVW coordinates system) by merely performing the operation.

After converting the coordinates on the space model (XYZ coordinates system) into the coordinates on the input image plane (UVW coordinates system), the coordinates correspondence part 10 computes an incident angle α formed by a line segment CP' connecting the optical center C (coordinates on the UVW coordinates system) of the camera 2 and coordinates P', which are arbitrary coordinates P on the space model expressed by the UVW coordinates system, and the optical axis G of the camera 2.

Also, the coordinates correspondence part 10 computes an argument φ and a length of a line segment EP', the argument φ being formed by the line segment EP', which connects the coordinates P' and an intersecting point E of a plane H and an optical axis G in the plane H, which is parallel to the input image plane R4 (e.g., a CCD surface) and containing the coordinates P', and a U'-axis in the plane H.

In an optical system of a camera, normally, an image height h is a function of an incident angle α and a focal distance f. Accordingly, the coordinate correspondence part 10 computes the image height h by selecting an appropriate projection system such as a normal projection (h=f tan α), an orthogonal projection (h=f sin α), a stereographic projection (h=2f tan(α/2)), an equisolid angle projection (h=f sin(α/2)), an equidistant projection (h=fα), etc.

Thereafter, the coordinates correspondence part 10 decomposes the image height h to a U-component and a V-component on the UV coordinates system according to an argument φ, and divides them by a numerical value corresponding to a pixel size per one pixel of the input image plane R4. In this way, the coordinates correspondence part 10 can determine the correspondence between the coordinates P (P') on the space model MD and the coordinates on the input image plane R4.

It is noted that when the pixel size per one pixel in the U-axis direction of the input image plane R4 is denoted as $a_u$, and the pixel size per one pixel in the V-axis direction of the input image plane R4 is denoted as $a_v$, the coordinates (u, v) on the input image plane R4 corresponding to the coordinates P (P') on the space model MD is expressed as follows.

$$u = \frac{h\cos\varphi}{a_U} \quad \text{[Formula 10]}$$

$$v = \frac{h\sin\varphi}{a_v} \quad \text{[Formula 11]}$$

In this way, the coordinates correspondence part 10 determines the correspondence between the coordinates on the space model MD and the coordinates on one or more input image planes R4 existing for each camera, and associates the coordinates on the space model MD with a camera identifier and the coordinates on the input image plane R4, and stores the correspondence relationship in the input image-space model correspondence relation map 40.

Because the coordinates correspondence part 10 of the present embodiment operates the conversion of coordinates using the quaternion, unlike a case in which a conversion of coordinates is operated using an Euler angle, the coordinates correspondence part 10 does not cause a gimbal lock. However, the coordinate correspondence part 10 is not limited to performing an operation of conversion of coordinates using a quaternion, but may also be configured to operate the conversion of coordinates using an Euler angle.

In a case where the coordinates on the space model MD can be associated with the coordinates of plural input image planes R4, the coordinates correspondence part 10 may determine the correspondence between the coordinates P (P') and the coordinates on the input image plane R4 of a camera with the smallest incident angle, or the coordinates correspondence part 10 may determine the correspondence between the coordinates P (P') and the coordinates on the input image plane R4 selected by an operator.

Next, a process of re-projecting the coordinates on the curved region R2 (coordinates having Z-axis direction components) of the coordinates on the space model MD onto the processing-target image plane R3 on the XY plane is described.

Figure 6A:
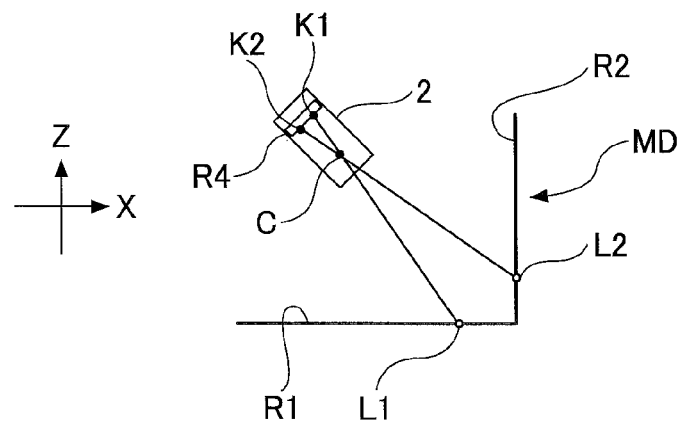
FIG. 6A illustrates operations of the coordinates correspondence part for determining a correspondence relationship between coordinates.

FIGS. 6A-6D illustrate exemplary correspondence relationships between coordinates. FIG. 6A illustrates an exemplary correspondence relationship between the coordinates on the input mage plane R4 of the camera 2 using a normal projection (h=f tan α) and the coordinates on the space model MD. The coordinates correspondence part 10 determines the correspondence between the coordinates by arranging each of line segments, which connect coordinates on the input image plane R4 of the camera 2 and the coordinates on the space model MD corresponding to the coordinates on the input image plane R4, pass the optical center C of the camera 2.

In the example illustrated in FIG. 6A, the coordinates correspondence part 10 associates the coordinates K1 on the input image plane R4 of the camera 2 with the coordinates L1 on the plane region R1 of the space model MD, and associates the coordinates K2 on the input image plane R4 of the camera 2 with the coordinates L2 on the curved region R2 of the space model MD. In this example, both the line segment K1-L1 and the line segment K2-L2 pass the optical center C of the camera 2.

It is noted that when the camera 2 uses projection systems (e.g., an orthogonal projection, a stereographic projection, an equisolid angle projection, an equidistant projection, etc.) other than the normal projection system, the coordinates correspondence part 10 associates the coordinates K1 and K2 on the input image plane R4 with the coordinates L1 and L2 on the space model MD according to the respective projection system.

Specifically, the coordinates correspondence part 10 associates the coordinates on the input image plane with the coordinates on the space model MD based on a predetermined function (e.g., an orthogonal projection (h=f sin α), a stereographic projection (h=2f tan(α/2)), an equisolid angle projection (h=f sin(α/2)), an equidistant projection (h=fα), etc.). In this case, the line segment K1-L1 and the line segment K2-L2 do not pass the optical center C of the camera 2.

Figure 6B:
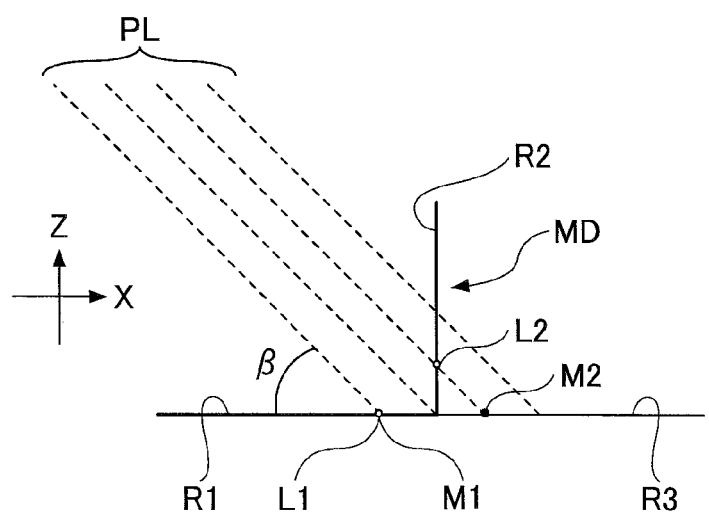
FIG. 6B illustrates operations of the coordinates correspondence part for determining a correspondence relationship between coordinates.

FIG. 6B illustrates an exemplary correspondence relationship between the coordinates on the curved region R2 of the space model MD and the coordinates on the processing-target image plane R3. The coordinates correspondence part 10 introduces a group of parallel lines PL, which are a group of parallel lines PL positioned on the XZ-plane and form an angle β between the processing-target image plane R3, and associates the coordinates with each other so that both the coordinates on the curved region R2 of the space model MD and the coordinates on the processing-target image plane R3 corresponding to the coordinates on the curved region R2 are positioned on one of the parallel lines.

In the example illustrated in FIG. 6B, the coordinates correspondence part 10 associates the coordinates with each other so that the coordinates L2 on the curved region R2 of the space model MD and the coordinates M2 on the processing-target image plane R3 are positioned on a common parallel line.

The coordinates correspondence part 10 can associate the coordinates on the plane region R1 of the space model MD with the coordinates on the processing-target image plane R3 using a group of parallel lines PL, similar to the coordinates on the curved region R2. However, in the example illustrated in FIG. 6B, because the plane region R1 and the processing-target image plane R3 lie in a common plane, the coordinates L1 on the plane region R1 on the space model MD and the coordinates M1 on the processing-target image plane R3 have the same coordinates value.

In this way, the coordinates correspondence part 10 associates the spatial coordinates on the space model MD with the projection coordinates on the processing-target image plane R3, and stores the coordinates on the space model MD and the coordinates on the processing-target image R3 in association with each other in the space model-processing-target image correspondence relation map 41.

Figure 6C:
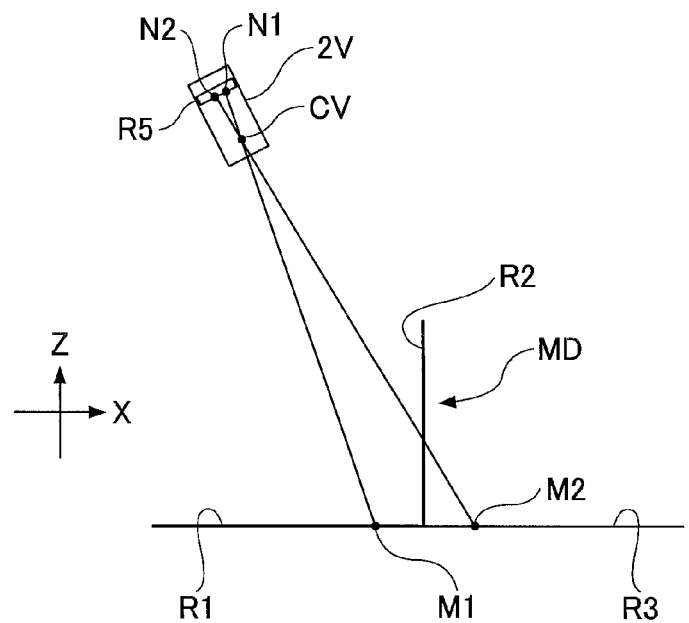
FIG. 6C illustrates operations of the coordinates correspondence part for determining a correspondence relationship between coordinates.

FIG. 6C illustrates an exemplary correspondence relationship between the coordinates on the processing-target image plane R3 and the coordinates on the output image plane R5 of the virtual camera 2V using, as an example, a normal projection (h=f tan α). The output image generation part 11 associates the coordinates with each other by arranging each of line segments connecting the coordinates on the output image plane R5 of the virtual camera 2V and the coordinates on the processing-target image plane R3 corresponding to the coordinates on the output image plane R5 to pass the optical center CV of the virtual camera 2V.

In the example illustrated in FIG. 6C, the output image generation part 11 associates the coordinates N1 on the output image plane R5 of the virtual camera 2V with the coordinates M1 on the processing-target image plane R3 (the plane region R1 of the space model MD), and associates the coordinates N2 on the output image plane R5 of the virtual camera 2V with the coordinates M2 on the processing-target image plane R3. In this example, both the line segment M1-N1 and the line segment M2-N2 pass the optical center CV of the virtual camera 2.

If the virtual camera 2 uses a projection systems other than a normal projection (e.g., an orthogonal projection, a stereographic projection, an equisolid angle projection, an equidistant projection, etc.), the output image generation part 11 associates the coordinates N1 and N2 on the output image plane R5 of the virtual camera 2V with the coordinates M1 and M2 on the processing-target image plane R3 according to the projection system used.

Specifically, the output image generation part 11 may associate the coordinates on the output image plane R5 with the coordinates on the processing-target image plane R3 based on a predetermined function (e.g., an orthogonal projection ($h=f \sin \alpha$), a stereographic projection ($h=2f \tan(\alpha/2)$), an equisolid angle projection ($h=f \sin(\alpha/2)$), an equidistant projection ($h=f\alpha$), etc.). In this case, the line segment M1-N1 and the line segment M2-N2 do not pass the optical center CV of the virtual camera 2V.

In this way, the output image generation part 11 associates the coordinates on the output image plane R5 with the coordinates on the processing-target image plane R3, and stores the coordinates on the output image plane R5 and the coordinates on the processing-target image plane R3 in association with each other in the processing-target image-output image correspondence relation map 42. Then, the output image generation part 11 generates the output image by referring to the values stored in the input image-space model correspondence relation map 40 and the space model-processing-target image correspondence relation map 41 by the coordinates correspondence part 10 to associate a value of each pixel in the output image with a value of each pixel in the input image.

Figure 6D:
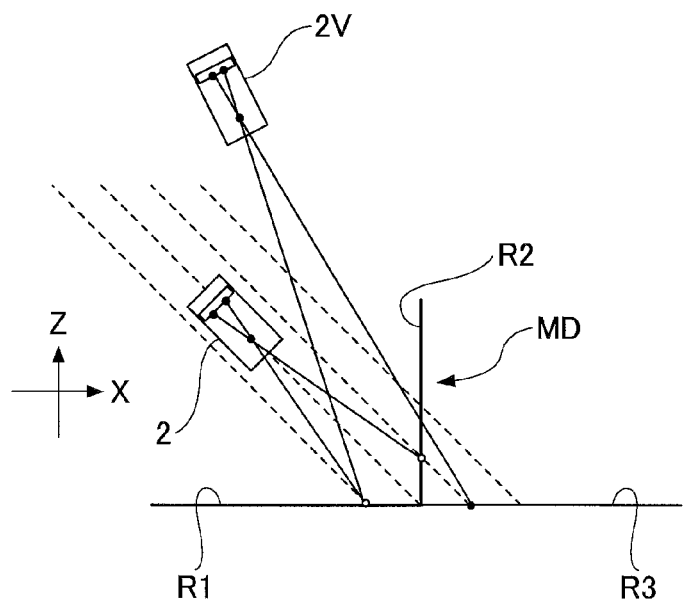
FIG. 6D illustrates operations of the coordinates correspondence part for determining a correspondence relationship between coordinates.

FIG. 6D is a combination of FIGS. 6A-6C, and illustrates a mutual positional relationship between the camera 2, the virtual camera 2V, the plane region R1 and the curved region R2 of the space model MD, and the processing-target image plane R3.

Figure 7A:
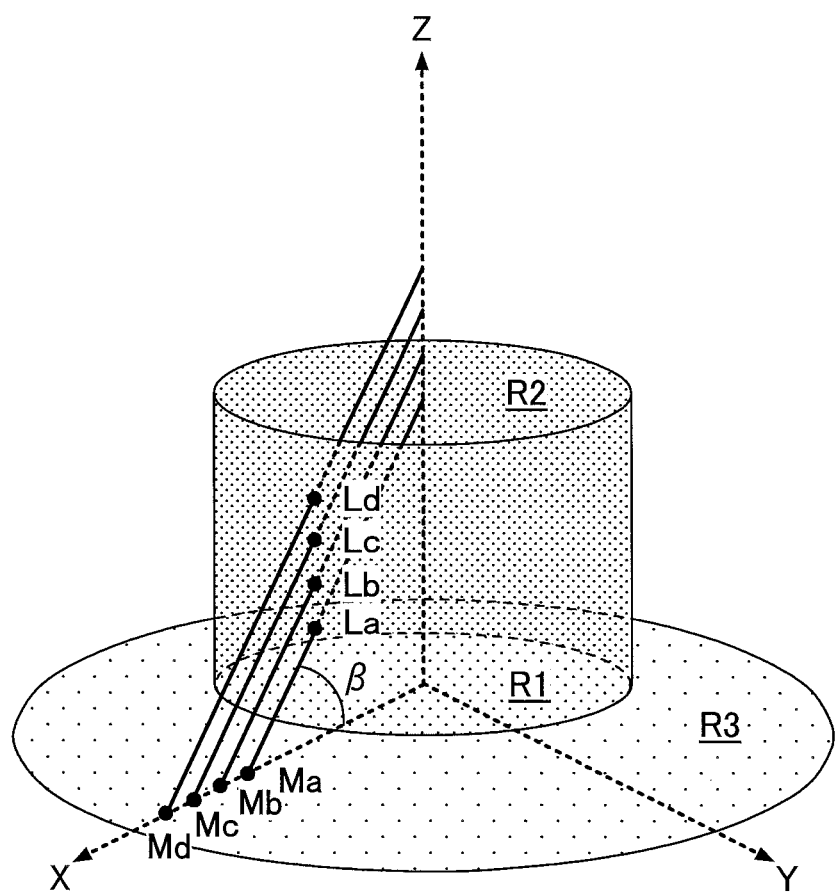
FIG. 7A illustrates an action of a group of parallel lines.
Figure 7B:
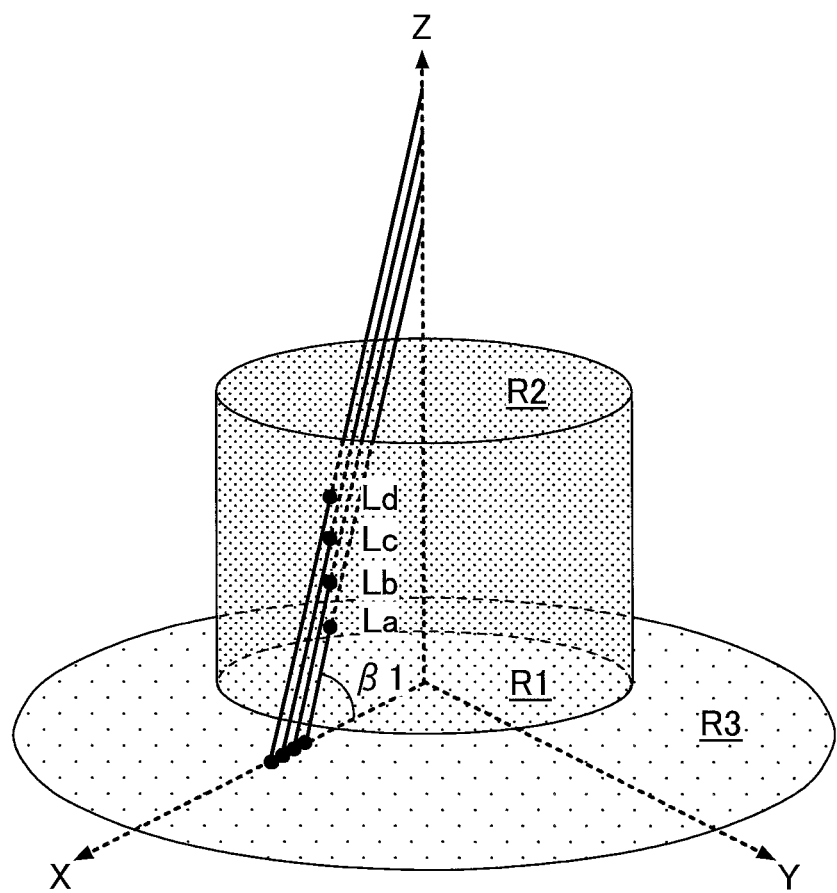
FIG. 7B illustrates an action of a group of parallel lines.

Next, a description is given, with reference to FIGS. 7A and 7B, of an action of the group of parallel lines that are introduced by the coordinates correspondence part 10 to associate the coordinates on the space model MD with the coordinates on the processing-target image plane R3.

FIG. 7A illustrates a case where an angle β is formed between the group of parallel lines PL positioned on the XZ-plane and the processing-target image plane R3. FIG. 7B illustrates a case where an angle β1 (β1>β) is formed between the group of parallel lines PL positioned on the XZ-plane and the processing-target image plane R3. The coordinates La through Ld on the curved region R2 of the space model MD in FIGS. 7A and 7B correspond to the coordinates Ma through Md on the processing-target image plane R3, respectively. The intervals of the coordinates La through Ld in FIG. 7A are equal to the intervals of the coordinates La through Ld in FIG. 7B, respectively. It is noted that although the group of parallel lines PL are arranged on the XZ-plane for the purpose of simplification of description, in practice, the parallel lines extend radially from all points on the Z-axis toward the processing-target image plane R3. The Z-axis in this case is referred to as "re-projection axis".

As illustrated in FIGS. 7A and 7B, the intervals of the coordinates Ma through Md on the processing-target image plane R3 decrease linearly as the angle between the group of parallel lines PL and processing-target image plane R3 increases. That is, the intervals of the coordinates Ma through Md decrease uniformly irrespective of the distance between the curved region R2 of the space model MD and each of the coordinates Ma through Md. On the other hand, in the example illustrated in FIGS. 7A and 7B, because a conversion to the group of coordinates on the processing-target image plane R3 is not performed, the intervals of the group of coordinates on the plane region R1 of the space model MD do not change.

The change in the intervals of the group of coordinates means that only an image portion corresponding to the image projected on the curved region R2 of the space model MD from among the image portions on the output image plane R5 (refer to FIG. 6C) is enlarged or reduced linearly.

Figure 8A:
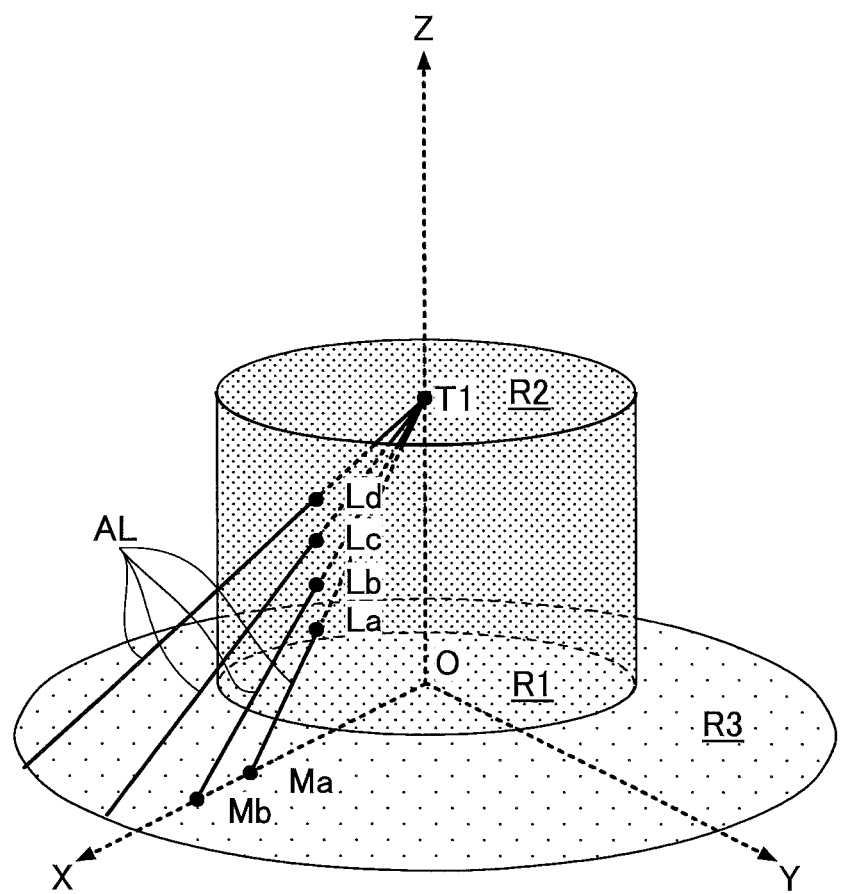
FIG. 8A illustrates an action of a group of auxiliary lines.
Figure 8B:
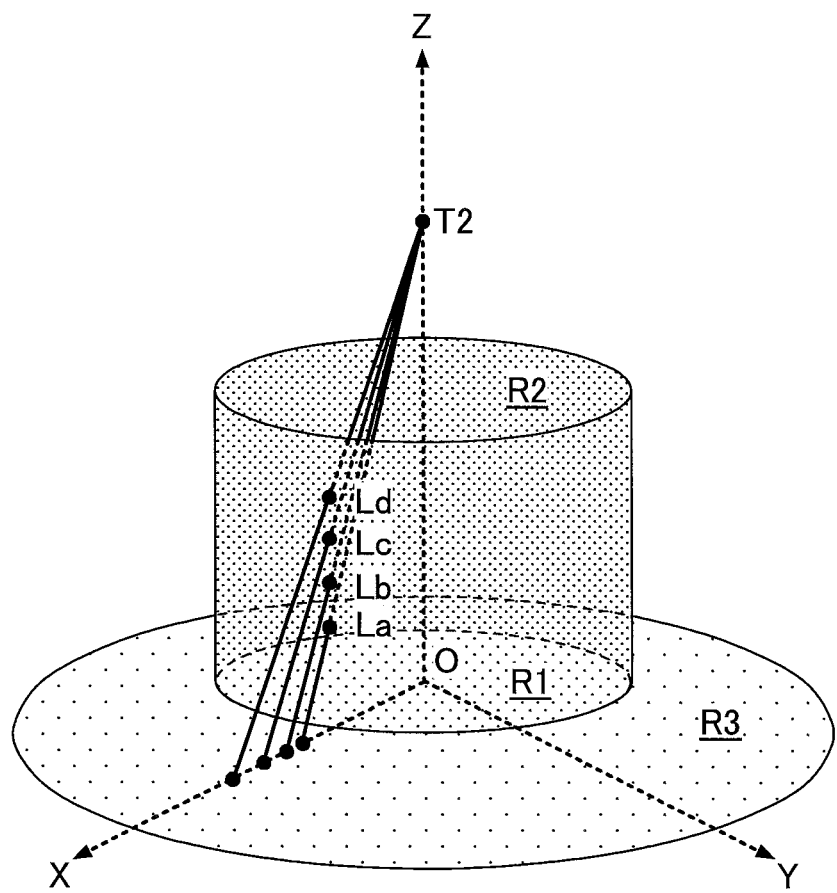
FIG. 8B illustrates an action of a group of auxiliary lines.

Next, a description is given, with reference to FIGS. 8A and 8B, of an alternative example of the group of parallel lines PL introduced by the coordinates correspondence part 10 to associate the coordinates on the space model MD with the coordinates on the processing-target image plane R3.

FIG. 8A illustrates a case where all of a group of auxiliary lines AL positioned on the XZ-plane extend from a start point T1 on the Z-axis toward the processing-target image plane R3. FIG. 8B illustrates a case where all of the group of auxiliary lines AL positioned on the XZ-plane extend from a start point T2 (T2>T1) on the Z-axis toward the processing-target image plane R3. The coordinates La through Ld on the curved region R2 of the space model MD in FIGS. 8A and 8B correspond to the coordinates Ma through Md on the processing-target image plane R3, respectively. In the example illustrated in FIG. 8A, the coordinates Mc and Md are not illustrated in the figure because they are out of the range of the processing-target image plane R3. The intervals of the coordinates La through Ld in FIG. 8A are equal to the intervals of the coordinates La through Ld in FIG. 8B, respectively. It is noted that although the group of auxiliary lines AL are arranged on the XZ-plane for the purpose of simplification of description, in practice, the auxiliary lines extend radially from an arbitrary point on the Z-axis toward the processing-target image plane R3. Similar to the example illustrated in FIGS. 7A and 7B, the Z-axis in this case is referred to as "re-projection axis".

As illustrated in FIGS. 8A and 8B, the intervals of the coordinates Ma through Md on the processing-target image plane R3 decrease nonlinearly as the distance (height) between the start point of the group of auxiliary lines AL and the origin O increases. That is, a degree of decrease of each of the intervals increases as the distance between the curved region R2 of the space model MD and each of the coordinated Ma through Md increases. On the other hand, in the example illustrated in FIGS. 8A and 8B, because a conversion to the group of coordinates on the processing-target image plane R3 is not performed, the intervals of the group of coordinates on the plane region R1 of the space model MD do not change.

Similar to the case of the group of parallel lines PL, the change in the intervals of the group of coordinates means that only an image portion corresponding to the image projected on the curved region R2 of the space model MD from among the image portions on the output image plane R5 (refer to FIG. 6C) is enlarged or reduced nonlinearly.

In this way, the image generation device 100 can linearly or nonlinearly enlarge or reduce an image portion (e.g., a horizontal image) of the output image corresponding to the image projected on the curved region R2 of the space model MD without affecting an image portion (e.g., a road image) of the output image corresponding to the image projected on the plane region R1 of the space model MD. That is, an object positioned around the excavator 60 (an object in an image of a surrounding view from the excavator 60 in a horizontal direction) can be rapidly and flexibly enlarged or reduced without affecting a road image (a virtual image when viewing the excavator from directly above) in the vicinity of the excavator 60. In this way, visibility of a dead angle area of the excavator 60 may be improved, for example.

Next, referring to FIG. 9, processes performed by the image generation device 100 for generating a processing-target image (referred to as "processing-target image generation process" hereinafter) and generating an output image using the generated processing-target image (referred to as "output image generation process" hereinafter) are described. FIG. 9 is a flowchart illustrating process steps of the processing-target image generation process (steps S1-3) and the output image generation process (steps S4-6). In the present example, it is assumed that the disposition of the camera 2 (input image plane R4), the space model (plane region R1 and curved region R2, and the processing-target image plane R3 is determined beforehand.

First, the coordinates correspondence part 10 of the control part 1 associates the coordinates on the processing-target image plane R3 with the coordinates on the space model MD (S1).

Specifically, the coordinates correspondence part 10 obtains an angle formed between the group of parallel lines PL and the processing-target image plane R3; computes a point of intersection between the curved region R2 of the space model MD and one of the group of parallel lines PL extending from one set of coordinates on the processing-target image plane R3; derives the coordinates on the processing-target image plane R3 corresponding to the computed point as one set of coordinates on the processing-target image plane R3 corresponding to the above one set of coordinates on the processing-target image plane R3; and stores the correspondence relation in the space model-processing-target image correspondence relation map 41. It is noted that the angle formed between the group of parallel lines PL and the processing-target image plane R3 may be a predetermined value stored in the storage part 4 or a value dynamically input by an operator via the input part 3.

Also, in a case where a set of coordinates on the processing-target image plane R3 matches a set of coordinates on the plane region R1 of the space model MD, the coordinates correspondence part 10 derives this set of coordinates on the plane region R1 as the coordinates corresponding to the set of coordinates on the processing-target image plane R3, and stores the correspondence relation in the space model-processing-target image correspondence relation map 41.

Then, the coordinates correspondence part 10 of the control part 1 associates the coordinates on the space model MD derived from the above process with the coordinates on the input image plane R4 (S2).

Specifically, the coordinates correspondence part 10 obtains the optical center C of the camera 2 that uses a normal projection (h=f tan α); computes a point of intersection between the input image plane R4 and a line segment extending from one set of coordinates on the space model MD and passing the optical center C; derives the coordinates on the input image plane R4 corresponding to the computed point as the set of coordinates on the input image plane R4 that corresponds to the above one set of coordinates on the space model MD; and stores the correspondence relation in the input image-space model correspondence map 40.

Then, the control part 1 determines whether all the coordinates on the processing-target image plane R3 have been associated with the coordinates on the space model MD and the coordinates on the input image plane R4 (S3). If it is determined that not all the coordinates on the processing-target image plane R3 have been associated (S3, NO), the control part 1 repeats the process steps S1 and S2.

On the other hand, if all the coordinates on the processing-target image plane R3 have been associated (S3, YES), the control part 1 ends the processing-target image generation process, and starts the output image generation process by having the output image generation part 11 associate the coordinates on the processing-target image plane R3 with the coordinates on the output image plane R5 (S4).

Specifically, the output image generation part 11 generates an output image by applying a scale conversion, an affine conversion or a distortion conversion to a processing-target image; and stores a correspondence relation between the coordinates on the processing-target image plane R3 and the coordinates on the output image plane R5 in the processing-target image-output image correspondence relation map 42, the correspondence relation being determined according to the applied scale conversion, affine conversion, or distortion conversion.

Alternatively, in the case of generating the output image using the virtual camera 2V, the output image generation part 11 may compute the coordinates on the output image plane R5 from the coordinates on the processing-target image plane R3 according to the projection system used, and store the correspondence relation between the coordinates on the processing-target image plane R3 and the coordinates on the output image plane R5 in the processing-target image-output image correspondence relation map 42.

Alternatively, in the case of generating the output image using the virtual camera 2V that uses a normal projection (h=f tan α), the output image generation part 11 may obtain the coordinate point of the optical center CV of the virtual camera 2V; compute a point of intersection between the processing-target image plane R3 and a line segment extending from one set of coordinates on the output image plane R5 and passing the optical center CV; derive the coordinates on the processing-target image plane R3 corresponding to the computed point as the coordinates on the processing-target image plane R3 corresponding to the above one set of coordinates on the output image plane R5; and store the correspondence relation in the processing-target image-output image correspondence relation map 42.

Then, the output image generation part 11 of the control part 1 refers to the input image-space model correspondence relation map 40, the space model-processing-target image correspondence relation map 41, and the processing-target image-output image correspondence relation map 42 to track the correspondence relation between the coordinates on the input image plane R4 and the coordinates on the space model MD, the correspondence relation between the coordinates on the space model MD and the coordinates on the processing-target image plane R3 and the correspondence relation between the processing-target image plane R3 and the coordinates on the output mage plane R5; obtains values (e.g., a brightness value, a color phase value, a chroma value, etc.) of the coordinates on the input image plane R4 corresponding to the coordinates on the output image plane R5; and uses the obtained values as values of the corresponding coordinates on the output image plane R5 (S5). It is noted that, in a case where plural sets of coordinates on plural input image planes R4 correspond to one set of coordinates on the output image plane R5, the output image generation part 11 may derive statistical values (for example, a mean value, a maximum value, a minimum value, an intermediate value, etc.) based on each of the values of the plural sets of coordinates on the plural input image planes R4, and use the statistical values as the values of the coordinates on the output image plane R5.

Then, the control part 1 determines whether the values of all the coordinates on the output image plane R5 have been associated with the values of the coordinates on the input mage plane R4 (S6). If it is determined that the values of all the coordinates have not been associated (S6, NO), the process steps S4-S5 are repeated.

On the other hand, if it is determined that the values of all the coordinates have been associated (S6, YES), the control part 1 generates an output image, and ends the series of processes.

It is noted that in the case where the image generation device 100 does not generate a processing-target image, the processing-target image generation process is omitted, and the "coordinates on the processing-target image plane" in step S4 of the output image generation process is read as "coordinates on the space model".

With the above configuration, the image generation device 100 may be able to generate the processing-target image and the output image that enables an operator to intuitively grasp the positional relationship between the construction machine and a surrounding obstacle.

Also, by tracking the coordinates correspondence from the processing-target image plane R3 to the input image plane R4 via the space model MD, the image generation device 100 may reliably associate each set of coordinates on the processing-target plane R3 with one or more sets of coordinates on the input image plane R4. In this way, a better quality processing-target image can be generated as compared to a case where a coordinate correspondence operation is performed in an order from the input image plane R4 to the processing-target image plane R3 via the space model MD. It is noted that in the case of performing a coordinate correspondence operation in an order from the input image plane R4 to the processing-target image plane R3 via the space model MD, although each set of coordinates on the input image plane R4 can be associated with one or more sets of coordinates on the processing-target image plane R3, there may be a case where a part of the coordinates on the processing-target image plane R3 cannot be associated with any of the coordinates on the input mage plane R4. In such a case, it is necessary to apply an interpolation process to the part of the coordinate points on the processing-target image plane R3.

Also, when enlarging or reducing only an image corresponding to the curved region R2 of the space model MD, the image generation device 100 can realize a desired enlargement or reduction by merely rewriting only a part associated with the curved region R2 in the space model-processing-target image correspondence relation map 41 by changing the angle formed between the group of parallel lines PL and the processing-target image plane R3 without rewriting the contents of the input image-space model correspondence relation map 40.

Also, when changing an appearance of the output image, the image generation device 100 is capable of generating a desire output image (a scale conversion image, an affine conversion image or a distortion conversion image) by merely rewriting the processing-target image-output image correspondence relation map 42 by changing various parameters regarding a scale conversion, an affine conversion or a distortion conversion without rewriting the contents of the input image-space model correspondence relation map 40 and the contents of the space model-processing-target image correspondence relation map 41.

Similarly, when changing a view point of the output image, the image generation device 100 is capable of generating an output image (view point conversion image) which is viewed from a desired view point by merely rewriting the processing-target image-output image correspondence relation map 42 by changing values of various parameters of the virtual camera 2V without rewriting the contents of the input image-space model correspondence relation map 40 and the space model-processing-target image correspondence relation map 41.

Figure 10:
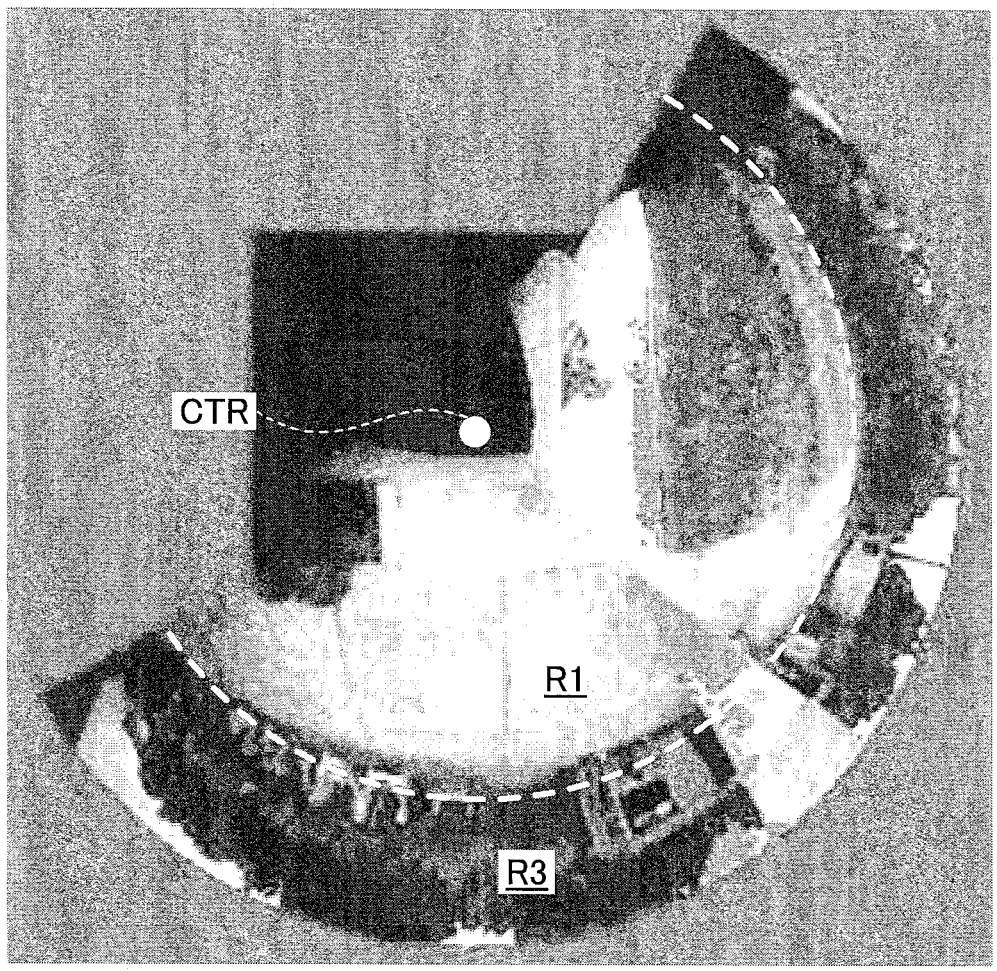
FIG. 10 illustrates a first exemplary display of an output image.

FIG. 10 illustrates an exemplary display output by the display part 5 representing an output image generated using input images of two cameras 2 (right side camera 2R and rear camera 2B) that are mounted on the excavator 60.

The image generation device 100 projects the input images of the two cameras 2 on the plane region R1 and the curved region R2 of the space model MD and re-projects the images on the processing-target image plane R3 to generate a processing-target image. Then, the image generation device 100 applies an image conversion process (e.g., scale conversion, affine conversion, distortion conversion, view-point conversion) on the generated processing-target image to generate an output image. In this way, the image generation device 100 simultaneously displays an image of the surrounding of the excavator 60 as viewed from above (image on plane region R1) and an image of the surrounding of the excavator 60 as viewed horizontally from the excavator 60 (image on the processing-target image plane R3).

It is noted that in the case where the image generation device 100 does not generate a processing-target image, the output image corresponds to an image generated by applying an image conversion process (e.g., viewpoint conversion process) on an input projected on the space model MD.

Also, the output image is trimmed to be in a circular shape so that the image when the excavator 60 performs a turning operation can be displayed without awkwardness. That is, the output image is displayed so that the center CTR of the circle is at the cylinder center axis of the space model, and also on the turning axis PV of the excavator 60, and the output image rotates about the center CTR thereof in response to the turning operation of the excavator 60. In this case, the cylinder center axis of the space model MD may be coincident with or not coincident with the re-projection axis.

The radius of the space model may be, for example, 5 meters. The angle formed by the group of parallel lines PL between the processing-target image plane R3 or the height of the start point of the group of auxiliary lines AL may be arranged so that, when an object (e.g., an operator) exists at a position distant from the turning center of the excavator 60 by a maximum reach distance (e.g., 12 meters) of an excavation attachment E, the object may be displayed sufficiently large (e.g., 7 millimeters or greater) at the display part 5.

Further, in the output image, a CG image of the excavator 60 is arranged so that a front of the excavator 60 is coincident with an upper portion of the screen of the display part 5 and the turning center thereof is coincident with the center CTR. This is done to facilitate recognition of a positional relationship between the excavator 60 and the object that appears in the output image. It is noted that a frame image containing various sets of information such as orientation may be arranged at a periphery of the output image.

Next, referring to FIGS. 11-16, a process performed by the image generation device 100 for preventing differences in the brightness of input images from standing out is described.

Figure 11:
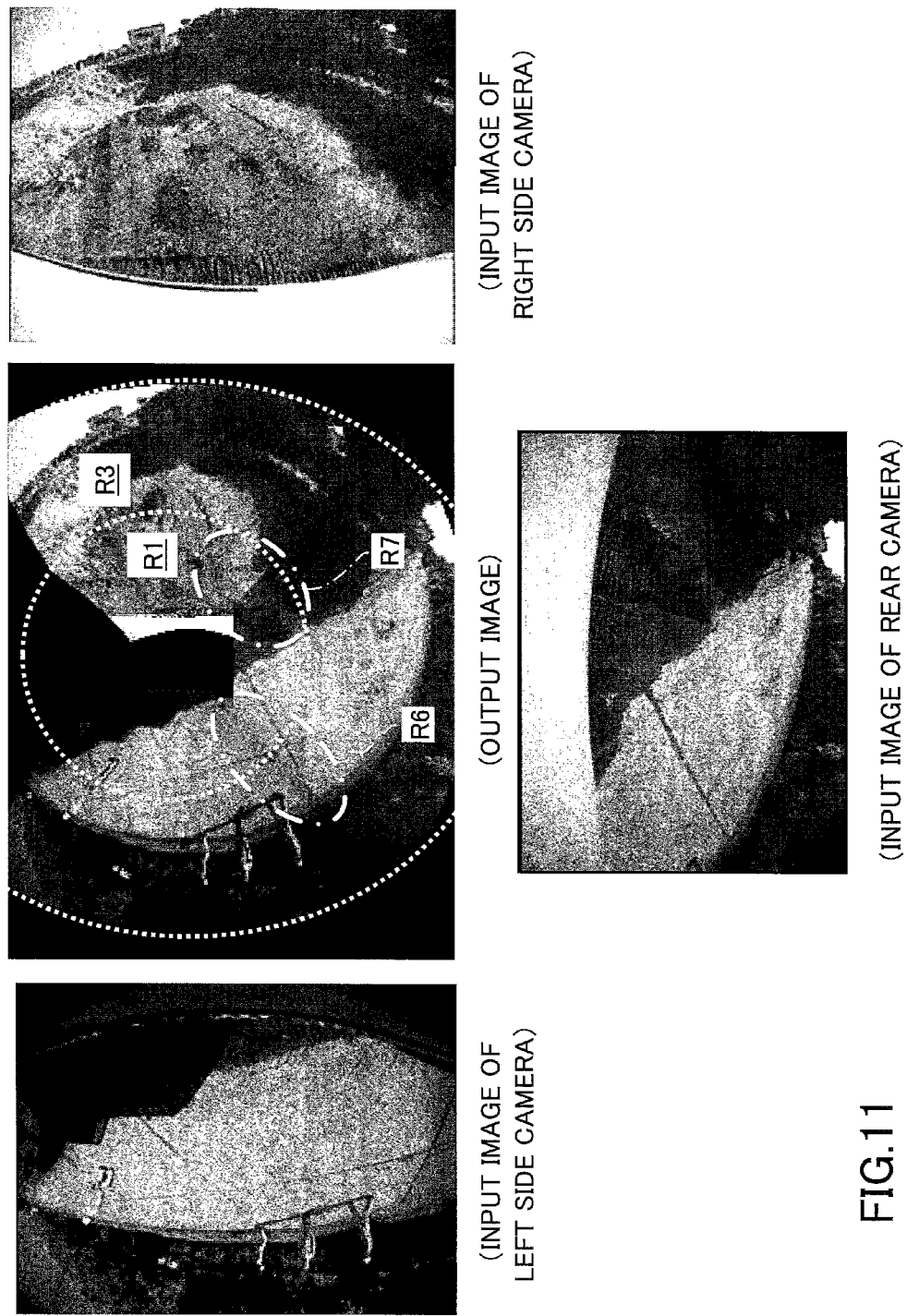
FIG. 11 illustrates a second exemplary display of an output image.

FIG. 11 illustrates input images of three cameras 2 (left side camera 2L, right side camera 2R, and rear camera 2B) that are mounted on the excavator 60 and an output image generated using these input images.

The image generation device 100 projects the input images of the three cameras 2 on the plane region R1 and the curved region R2 of the space model MD and re-projects the images on the processing-target image plane R3 to generate a processing-target image. Then, the image generation device 100 applies an image conversion process (e.g., scale conversion, affine conversion, distortion conversion, viewpoint conversion) on the generated processing-target image to generate an output image. In this way, the image generation device 100 simultaneously displays an image of the surrounding of the excavator 60 as viewed from above (image on plane region R1) and an image of the surrounding of the excavator 60 as viewed horizontally from the excavator 60 (image on the processing-target image plane R3).

In FIG. 11, the input image of the left side camera 2L and the input image of the rear camera 2B have overlapping portions corresponding to the same location within the surrounding of the excavator 60 that are captured from different angles. These overlapping portions have differing brightness levels owing to the different lighting conditions under which the respective input images are captured, for example. The same applies to the overlapping portions of the input image of the right side camera 2R and the input image of the rear camera 2B.

Referring to the output image generated based on these three input images, when coordinates of an output image can correspond to coordinates of plural input images and the coordinates of the output image are associated with coordinates of the input image of the camera with the smallest incident angle, an abrupt change in brightness occurs at a boundary portion of the output image even though the same location is being captured. That is, abrupt changes in brightness may be seen at the boundary between a region of the output image that is based on the input image of the left side camera 2L and a region of the output image that is based on the input image of the rear camera 2B (see region R6 surrounded by a dot-dashed line) and at the boundary between a region of the output image that is based on the input image of the right side camera 2R and a region of the output image that is based on the input image of the rear camera 2B (see region R7 surrounded by a dot-dashed line). As a result, the output image may appear unnatural and awkward to the operator viewing the output image.

In this regard, the image generation device 100 of the present embodiment uses the checker shadow illusion (same color illusion) effect to prevent the differences in brightness of the input images from standing out.

Figure 12A:
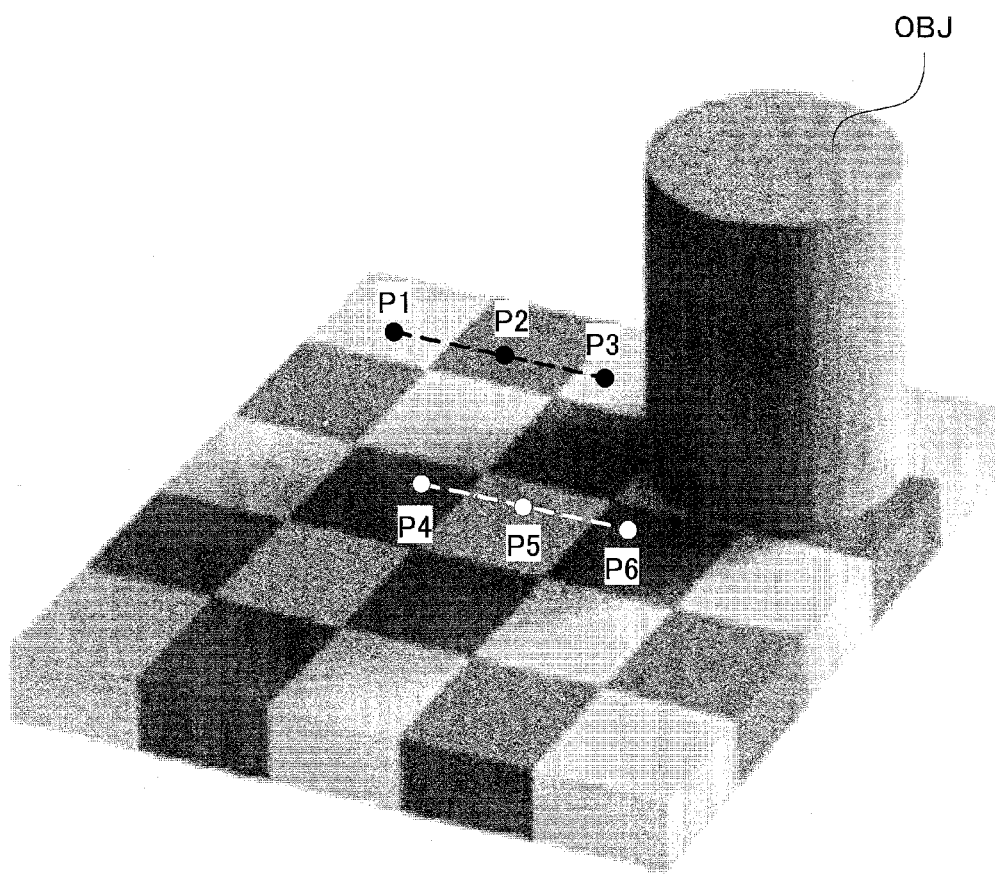
FIG. 12A is a diagram illustrating a same color illusion.

FIGS. 12A-12B are diagrams explaining the checker shadow illusion (Edward H. Adelson, "Checker shadow illusion," 1995 <http://web.mit.edu/persci/people/adelson/checkershadow_illusion.html>). FIG. 12A illustrates a checker pattern (lattice pattern) that is used in bringing about a same color illusion; and FIG. 12B is a graph representing changes in brightness of at points P1-P3 and points P4-P6 on the checker pattern (lattice pattern) of FIG. 12A.

As illustrated in FIG. 12A, a unit pattern including point P2, which is positioned between two unit patterns having a higher brightness than the unit pattern including point P2 (i.e., unit pattern including point P1 and unit pattern including point P3), will appear less brighter than a unit pattern including point P5, which is positioned between two unit patterns having a lower brightness than the unit pattern including point P5 (i.e., unit pattern including point P4 and unit pattern including point P6).

However, this difference in brightness is due to an illusion of an observer who recognizes that the unit patterns form a lattice pattern and that the group of unit patterns including points P4-P6 is in the shadow of an object OBJ. As illustrated in FIG. 12B, in reality, the brightness of the unit pattern including point P2 is equal to the brightness of the unit pattern including point P5. That is, the observer may be under the illusion that the unit patterns including points P1, P3, and P5 have the same brightness, and the unit patterns including points P2, P4, and P6 have the same brightness.

Figure 13:
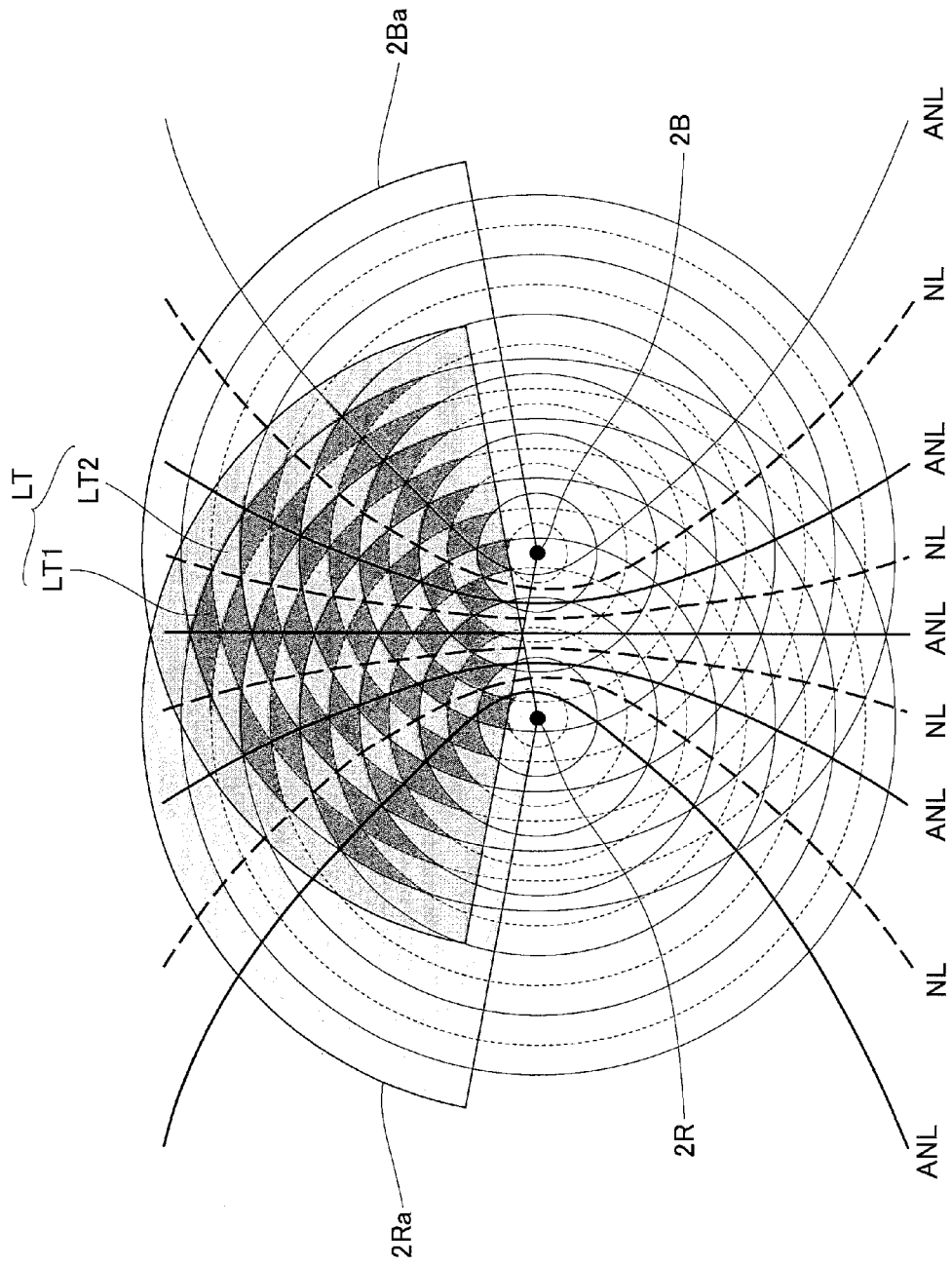
FIG. 13 illustrates an exemplary method of generating a light-dark lattice pattern that brings about a same color illusion.

FIG. 13 is a diagram explaining an exemplary method of generating a light-dark pattern that brings about a same color illusion. FIG. 13 illustrates two interfering waves from two wave sources that propagate forming peaks (solid line circle) and troughs (dashed line circle). The two wave sources may be the right side camera 2R and the rear camera 2B, for example. It is noted that the right side camera 2R is shown on the left side in FIG. 13 for the sake of simplification of the description. Thus, it is assumed that the upper right side of FIG. 13 corresponds to the rear side of the excavator 60.

Also, in FIG. 13, two fan-shaped regions 2Ra and 2Ba respectively represent the image capturing range of the right side camera 2R and the image capturing range of the rear camera 2B. Bold solid lines representing antinodal lines ANL correspond to a succession of points where the two waves reinforce each other, and bold dashed lines representing nodal lines NL correspond to a succession of points where the two waves weaken each other. As illustrated in FIG. 13, the antinodal lines ANL and the nodal lines occur alternately.

Also, in FIG. 13, a diamond-shaped region defined by a line delineated by one trough of the wave propagating from the right side camera 2R as the wave source (dashes line circle), a line delineated by a peak following the above trough (solid line circle), a line delineated by one trough of the wave propagating from the rear camera 2B as the wave source (dashes line circle), and a line delineated by a peak following the above trough (solid line circle) defines a unit pattern region LT.

When the unit pattern regions LT illustrated in FIG. 13 are depicted on an output image plane, and unit pattern regions LT1 of the unit pattern regions LT that intersect with the antinodal lines ANL (dark gray regions) are associated with the input image of the rear camera 2B, while unit pattern regions LT2 of the unit pattern regions LT that intersect with the nodal lines NL (light gray regions) are associated with the input image of the right side camera 2R, the two input images with differing average brightness levels may form a lattice pattern that can bring about a same color illusion.

It is noted that a similar effect may be obtained in a case where the unit pattern regions LT1 of the unit pattern regions LT that intersect with the antinodal lines ANL (dark gray regions) are associated with the input image of the right side camera 2R, and the unit pattern regions LT2 of the unit pattern regions LT that intersect with the nodal lines NL (light gray regions) are associated with the input image of the rear camera 2B. That is, the two input images with differing average brightness levels may form a lattice pattern that can bring about a same color illusion.

Also, it is noted that although the lattice pattern of FIG. 13 is formed using two waves with the same wavelength and phase, two waves with different wavelengths and/or phases may be used to form the lattice pattern as well. In this way, the shapes and sizes of the unit pattern regions LT1 and LT2 may be flexibly adjusted.

Figure 14:
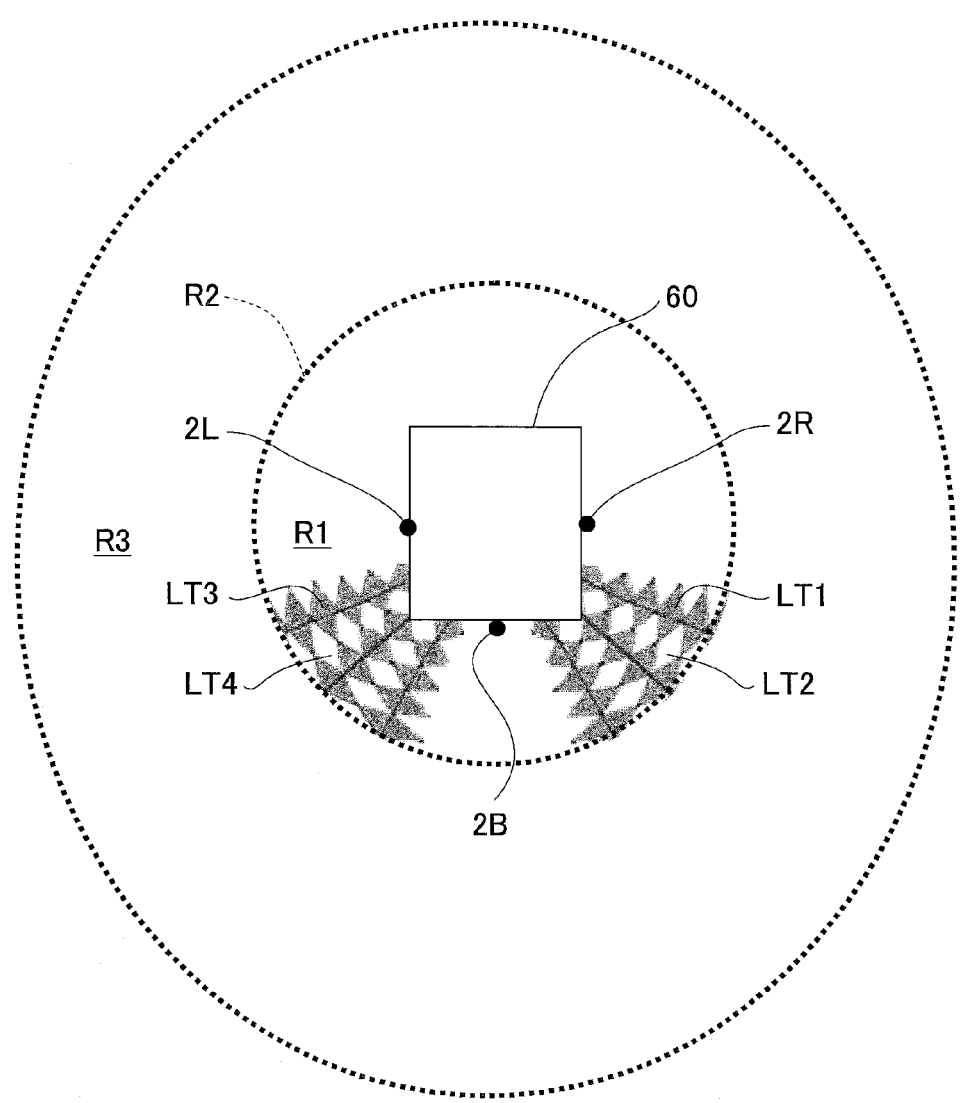
FIG. 14 illustrates an output image having the lattice pattern of FIG. 13 arranged thereon.

FIG. 14 illustrates an example in which the lattice pattern of FIG. 13 is arranged on an output image plane (plane region R1). That is, FIG. 14 illustrates a lattice pattern arranged at an overlapping area of the image capturing ranges of the right side camera 2R and the rear camera 2B at the right rear side of a CG image of the excavator 60 (lower right side of FIG. 14), and a lattice pattern arranged at an overlapping area of the image capturing ranges of the left side camera 2L and the rear camera 2B at the left rear side of the CG image of the excavator 60 (lower left side of FIG. 14).

In FIG. 14, the lattice pattern arranged at the overlapping area of the image capturing ranges of the right side camera 2R and the rear camera 2B may be formed by associating unit pattern regions LT1 (grey regions) with the input image of the right side camera 2R, and associating unit pattern regions LT2 (white regions) with the input image of the rear camera 2B, for example.

Also, the lattice pattern arranged at the overlapping area of the image capturing ranges of the left side camera 2L and the rear camera 2B may be formed by associating unit pattern regions LT3 (grey regions) with the input image of the left side camera 2L, and associating unit pattern regions LT4 (white regions) with the input image of the rear camera 2B, for example.

Figure 15:
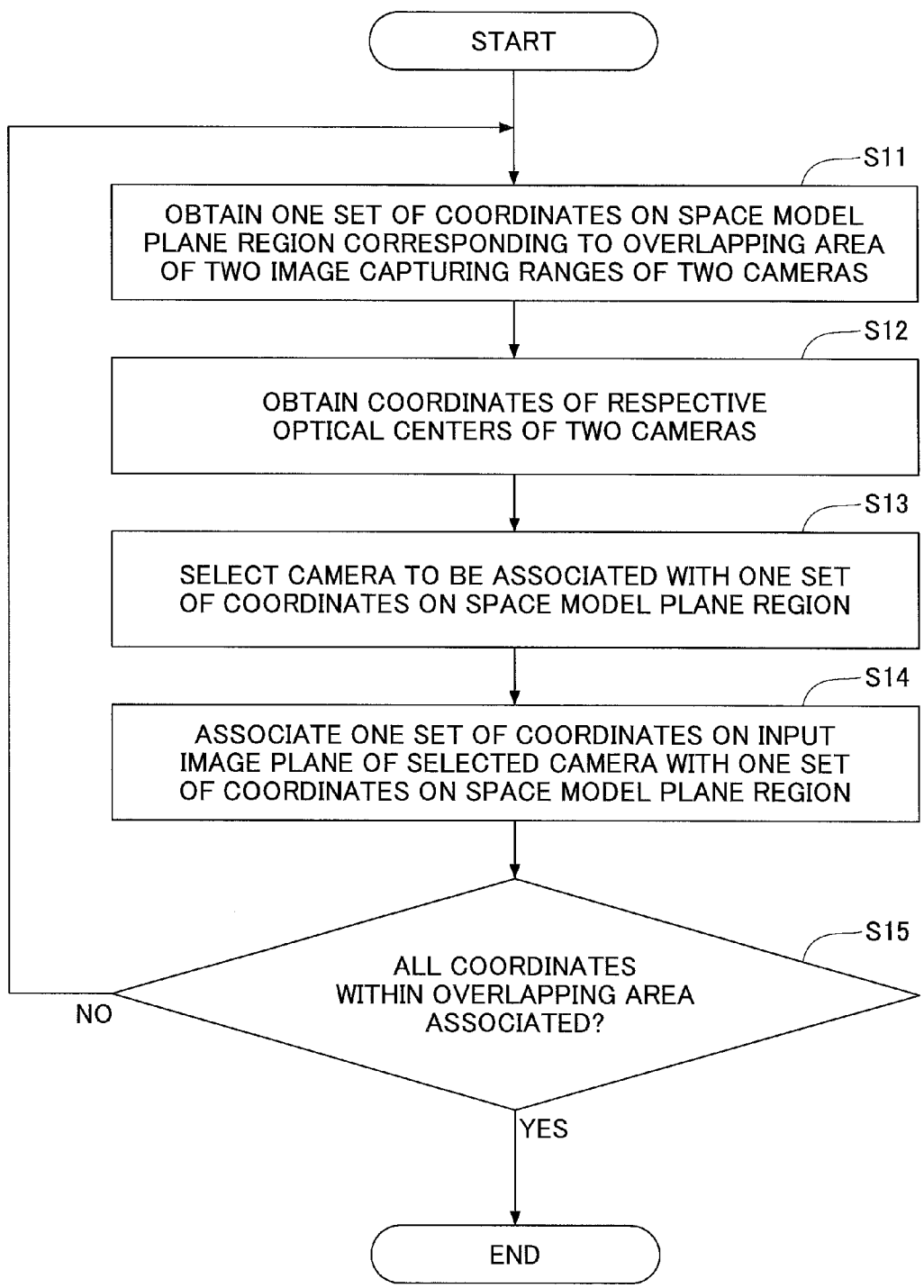
FIG. 15 is a flowchart illustrating a lattice pattern forming process.

FIG. 15 is a flowchart illustrating process steps of a process performed by the image generation device 100 for forming a lattice pattern that brings about a same color illusion (referred to as "lattice pattern forming process" hereinafter) by associating the coordinates on an output image plane corresponding to an overlapping area of the image capturing ranges of two cameras with the coordinates on an input image plane of an input image of one of the above cameras.

It is noted that the lattice pattern forming process may be performed by the control part 1 of the image generation device 100 in the case where the coordinates correspondence part 10 can associate a set of coordinates on the plane region R1 of the space model MD with plural sets of coordinates on plural input image planes in step S2 of the processing-target image generation process of FIG. 9, and where one set of coordinates on the plane region R1 of the space model MD is to be associated with one set of coordinates on one of two input image planes of two cameras.

First, the control part 1 obtains one set of coordinates on the plane region R1 of the space model MD corresponding to the overlapping area of the image capturing ranges of two cameras (e.g., right side camera 2R and rear camera 2B) (S11).

Then, the control part 1 obtains the coordinates of the respective optical centers of the two cameras (S12).

Then, the control part 1 selects the camera to be associated with the one set of coordinates on the plane region R1 of the space model MD obtained in step S11 (S13).

Specifically, assuming the coordinates of the optical center of the right side camera 2R is denoted as $(X_{cam1}, Y_{cam1})$ the coordinates of the optical center of the rear camera 2B is denoted as $(X_{cam2}, Y_{cam2})$ and the one set of coordinates on the plane region R1 of the space model MD corresponding to the associating target is denoted as $(X_{target}, Y_{target})$ the control part 1 selects one of the cameras based on whether the following Formula 12 is true or false.

$$0 < \sin(\sqrt{(X_{cam1}-X_{target})^2+(Y_{cam1}-Y_{target})^2}) \times \sin(\sqrt{(X_{cam2}-X_{target})^2+(Y_{cam2}-Y_{target})^2})$$ [Formula 12]

When the above conditional expression is true, the control part 1 selects the right side camera 2R as the camera to be associated with the one set of coordinates on the plane region R1. When the above conditional expression is false, the control part selects the rear camera 2B as the camera to be associated with the one set of coordinates on the plane region R1.

Alternatively, the control part may select the rear camera 2B as the camera to be associated with the one set of coordinates on the plane region R1 when the above conditional expression is true, and select the right side camera 2R as the camera to be associated with the one set of coordinates on the plane region R1 when the above conditional expression is false.

It is noted that the above conditional expression corresponds to a formula for determining whether the coordinates on the plane region R1 $(X_{target}, Y_{target})$ is included in the unit pattern region LT1 of FIG. 14 or the unit pattern region LT2.

Also, it is noted that in the present embodiment, the control part 1 selects the camera to be associated with the one set of coordinates on the plane region R1 based on a two-dimensional distance between the one set of coordinates on the plane region R1 (two-dimensional coordinates) and the coordinates of the optical centers of the two cameras (two-dimensional coordinates projected on a plane including the plane region R1) under the premise that the coordinates of the optical centers are two-dimensional coordinates and the waves from the wave sources correspond to planar waves. However, in another embodiment, where the coordinates of the optical centers may be three-dimensional coordinates (including height information) and the waves generated from the wave sources correspond to spherical waves, the control part 1 may select the camera to be associated with the coordinates on the plane region R1 based on a three-dimensional distance between the one set of coordinates on the plane region R1 (three-dimensional coordinates) and the coordinates of the optical centers of the two cameras (three-dimensional coordinates).

Also, it is noted that in the present embodiment, the control part 1 selects the camera to be associated with the one set of coordinates on the plane region R1 of the space model MD corresponding to the overlapping area of the image capturing ranges of two cameras (e.g., right side camera 2R and rear camera 2B). However, in another embodiment, the control part 1 may select the camera to be associated with one set of coordinates on the processing-target image plane R3.

In this case, the control part 1 may select the camera to be associated with one set of coordinates on the processing-target image plane R3 based on a two-dimensional distance between the one set of coordinates on the processing-target image plane R3 (two-dimensional coordinates) and the coordinates of the optical centers of the two cameras (two-dimensional coordinates projected on a plane including the processing-target image plane R3), or the control part 1 may select the camera to be associated with the coordinates on the processing-target image plane R3 based on a three-dimensional distance between the one set of coordinates on the processing-target image plane R3 (three-dimensional coordinates) and the coordinates of the optical centers of the two cameras (three-dimensional coordinates). It is noted that the processing-target image plane R3 may include the plane region R1.

Then, the coordinates correspondence part 10 of the control part 1 associates the one set of coordinates on the plane region R1 of the space model MD with one set of coordinates on the input image plane of the selected camera (S14), and stores the coordinates on the space model MD, the camera ID, and the coordinates on the input image plane in association with each other in the input image-space model correspondence map 40.

Then, the control part 1 determines whether all coordinates on the plane region R1 of the space model MD corresponding to the overlapping area of the image capturing ranges of the two cameras have been associated with the coordinates of the input image plane of one of the two cameras (S15). If it is determined that not all of the coordinates have been associated (S15, NO), steps S11-S14 are repeated.

On the other hand, if it is determined that all the coordinates have been associated (S15, YES), the lattice pattern forming process is ended.

It is noted that in the above descriptions, the control part 1 associates the coordinates on the plane region R1 of the space model MD corresponding to the overlapping area of the image capturing ranges of the two cameras or the coordinates on the processing-target image plane 3 with the coordinates of the input image plane of one of the two cameras. In a further embodiment, the control part 1 may also associate the coordinates of the curved region R2 of the space model MD with coordinates of the input image plane of one of the two cameras.

As described above, by using the above conditional expression (Formula 12), the control part 1 may easily associate coordinates on the space model MD with coordinates on the input image plane of one of two cameras to generate a desired lattice pattern.

FIG. 16 shows the output image of FIG. 11 and an output image generated by applying the lattice pattern for bringing about a same color illusion on the output image of FIG. 11 to illustrate their difference. Specifically, the image at the top of FIG. 16 corresponds to the output image of FIG. 11, and the image at the bottom of FIG. 16 corresponds to the output image using the lattice pattern for bringing about the same color illusion.

As can be appreciated, a striking difference in brightness can be seen in the region R6 surrounded by a dot-dashed line in the top image of FIG. 16 that includes the boundary between a region of the output image based on the input image of the left side camera 2L and a region of the output image based on the input image of the rear camera 2B. However, the difference in brightness is toned down to be less noticeable in a region R8 surrounded by a dot-dashed line in the bottom image of FIG. 16 that has regions of the output image based on the input image of the left side camera 2L and regions of the output image based on the input image of the rear camera 2B arranged in a lattice pattern. Thus, an operator viewing the output image including the region R8 may be less likely to sense some awkwardness or unnaturalness in the output image.

Similarly, a striking difference in brightness can be seen in the region R7 surrounded by a dot-dashed line in the top image of FIG. 16 that includes the boundary between a region of the output image based on the input image of the right side camera 2R and a region of the output image based on the input image of the rear camera 2B. However, the difference in brightness is toned down to be less noticeable in a region R9 surrounded by a dot-dashed line in the bottom image of FIG. 16 that has regions of the output image based on the input image of the right side camera 2R and regions of the output image based on the input image of the rear camera 2B arranged in a lattice pattern. Thus, an operator viewing the output image including the region R9 may be less likely to sense some awkwardness or unnaturalness in the output image.

Figure 17:
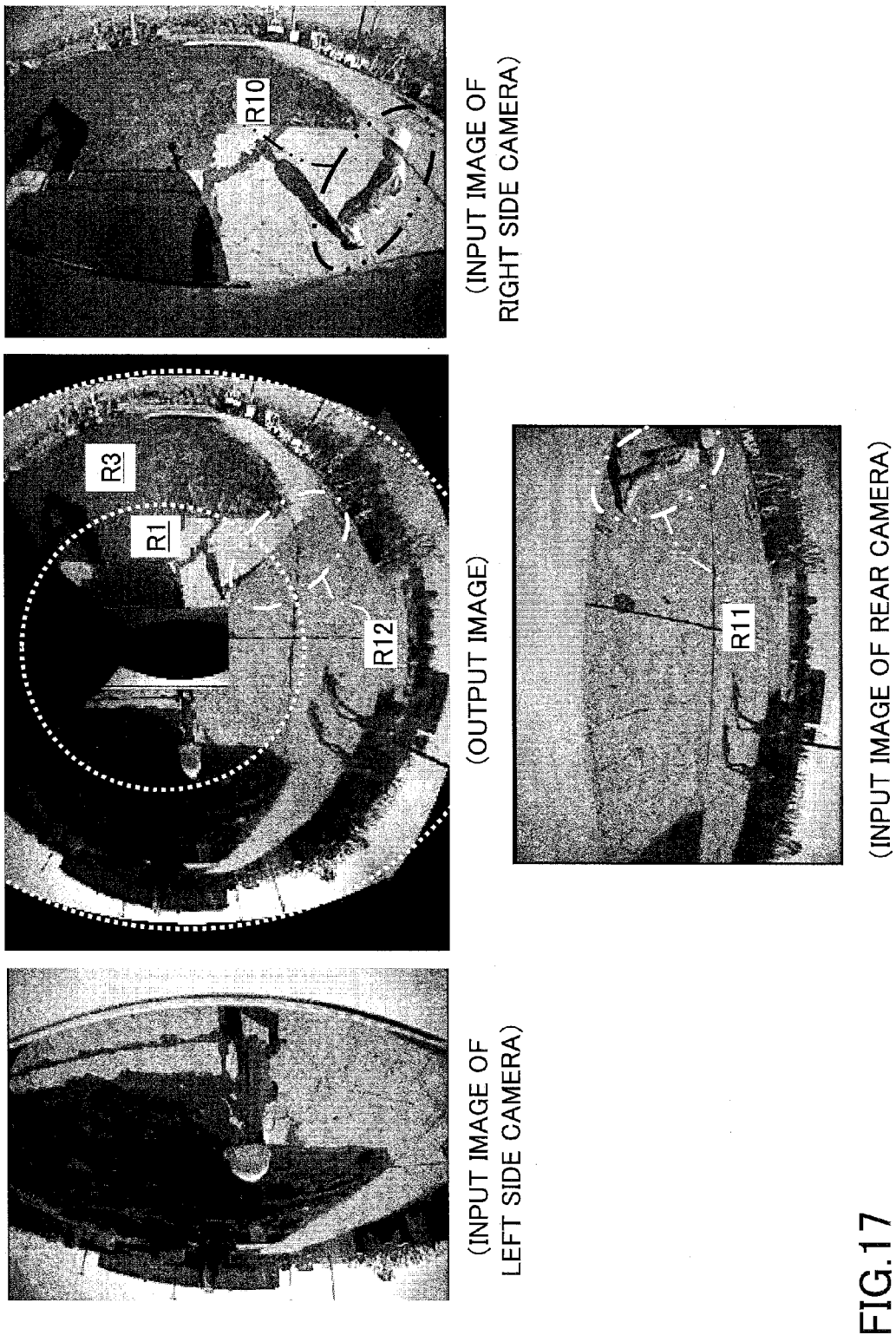
FIG. 17 illustrates a third exemplary display of an output image.

FIG. 17 shows input images of three cameras 2 (left side camera 2L, right side cameral 2R, and rear camera 2B) that are mounted on the excavator 60 and an output image generated based on these input images.

The image generation device 100 projects the coordinates on the input image planes of the three cameras 2 on the plane region R1 and the curved region R2 of the space model MD and re-projects the images on the processing-target image plane R3 to generate a processing-target image. Then, the image generation device 100 applies an image conversion process (e.g., scale conversion, affine conversion, distortion conversion, viewpoint conversion) on the generated processing-target image to generate an output image. In this way, the image generation device 100 simultaneously displays an image of the surrounding of the excavator 60 as viewed from above (image on plane region R1) and an image of the surrounding of the excavator 60 as viewed horizontally from the excavator 60 (image on the processing-target image plane R3).

In FIG. 17, the input image of the right side camera 2R and the input image of the rear camera 2B each have an image of a person captured positioned within an overlapping area of the image capturing ranges of the right side camera 2R and the rear camera 2B (see region R10 surrounded by two-dot-dashed line in the input image of the right side camera 2R and region R11 surrounded by a two-dot-dashed line in the input image of the rear camera 2B).

However, as illustrated in FIG. 17, in a case where an output image based on the input image of the right side camera 2R and the input image of the rear camera 2B is generated by associating the coordinates on the output image plane with the coordinates of the input image plane of the camera with the smallest incident angle, the image of the person within the overlapping area disappears (see region R12 surrounded by a one-dot-dashed line in the output image).

Thus, in generating an output image portion corresponding to an overlapping area of the image capturing ranges of two cameras, the image generation device 100 of the present embodiment uses the lattice pattern for bringing about a same color illusion to prevent an object located within the overlapping area from disappearing from the output image portion.

Figure 18A:
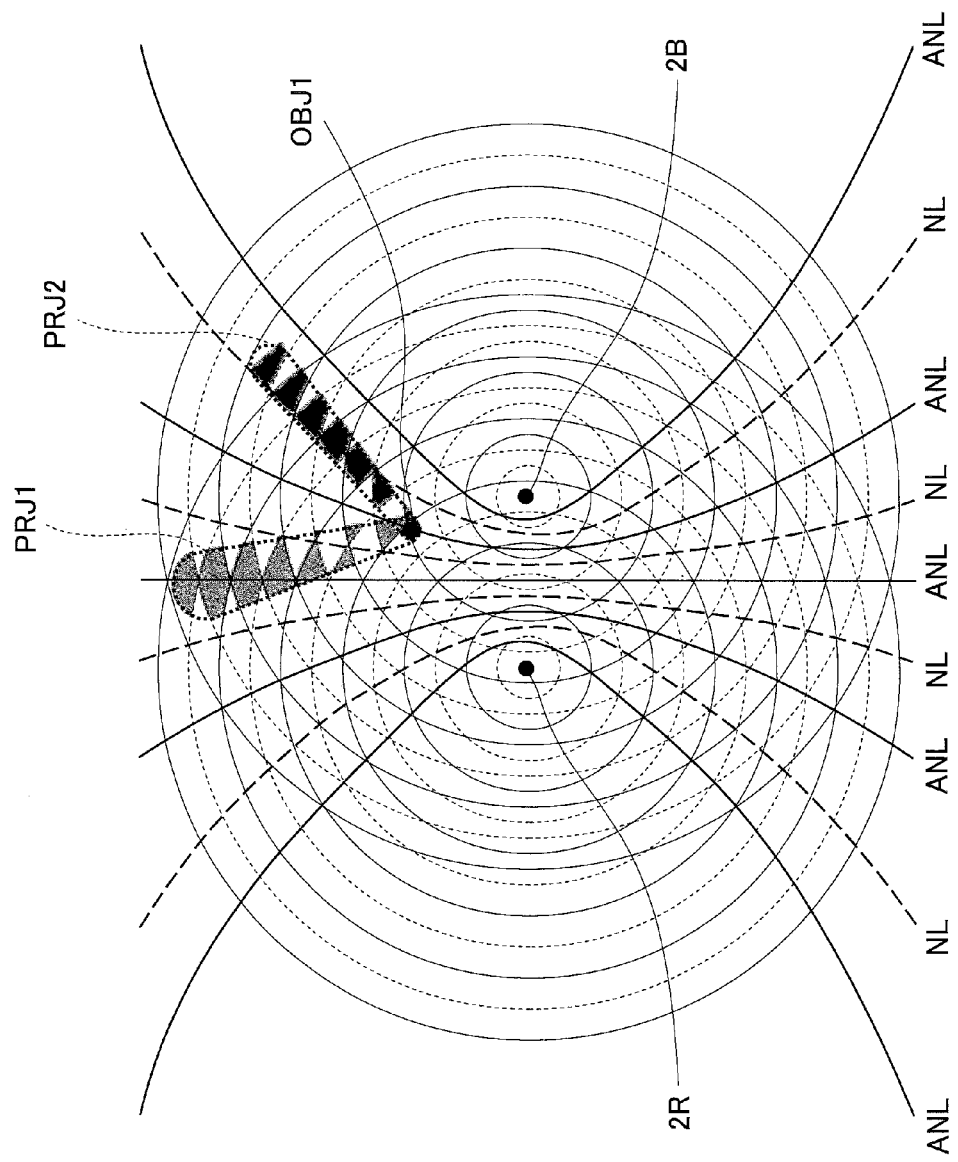
FIG. 18A illustrates an exemplary method of preventing an object within an overlapping area of the image capturing ranges of two cameras from disappearing from an output image.
Figure 18B:
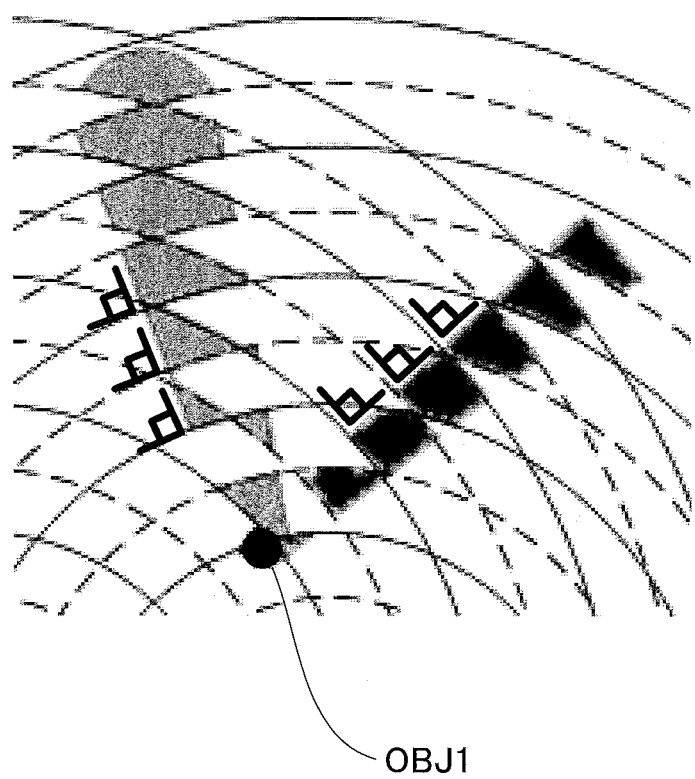
FIG. 18B is a partial enlarged view of FIG. 18A.

FIGS. 18A-18B illustrate the prevention of the disappearance of an object from an overlapping area of the image capturing ranges of two cameras. FIG. 18A illustrates waves for forming the lattice pattern of FIG. 13 for bringing about a same color illusion, and FIG. 18B is a partial enlarged view of FIG. 18A.

In FIG. 18A, a projection image PRJ1 that is surrounded by a dotted line represents an image of an object OBJ1 in the input image of the rear camera 2B that is elongated in the extending direction of a line connecting the rear camera 2B to the object OBJ1 as a result of applying a viewpoint conversion on the input image for generating a road image (i.e., image displayed in the case of generating a road image at the output image portion using the input image of the rear camera 2B).

Also, a projection image PRJ2 that is surrounded by a dotted line represents an image of an object OBJ1 in the input image of the right side camera 2R that is elongated in the extending direction of a line connecting the right side camera 2R to the object OBJ1 as a result of applying a viewpoint conversion on the input image for generating a road image (i.e., image displayed in the case of generating a road image at the output image portion using the input image of the right side camera 2R).

It is noted that the projection image PRJ1 and the projection image PRJ2 are not displayed as is on the final output image. That is, as illustrated in FIG. 18B, the projection images PRJ1 and PRJ2 are partly cut off upon being displayed in an output image.

Also, in FIG. 18A, grey portions of the dotted region representing the projection image PRJ1 represent portions overlapping with the unit pattern regions LT1 intersecting the antinodal line ANL (see FIG. 13), and the coordinates on the output image corresponding to these overlapping portions are associated with coordinates on the input image plane of the rear camera 2B (coordinates within a region forming the image of the object OBJ1).

On the other hand, the white portions of the dotted region representing the projection image PRJ1 represent portions overlapping with the unit pattern regions LT2 intersecting the nodal line NL (see FIG. 13), and the coordinates on the output image corresponding to these overlapping portions are associated with coordinates on the input image plane of the right side camera 2R (coordinates within a region that does not form the image of the object OBJ1).

Alternatively, the coordinates on the output image corresponding to the grey portions of the dotted region representing the projection image PRJ1 may be associated with the coordinates of the input image plane of the right side camera 2R (coordinates within a region that does not form the image of the object OBJ1), and the coordinates on the output image corresponding to the white portions of the dotted region representing the projection image PRJ1 may be associated with the coordinates of the input image plane of the rear camera 2B (coordinates within a region forming the image of the object OBJ1).

As illustrated in FIG. 18B, although the projection image PRJ1 is cut off by the unit pattern regions LT2 that include sections of the circles orthogonally intersecting the elongating direction of the projection image PRJ1 (circles delineated by the peaks and troughs of the wave propagated from the position of the rear camera 2B) as boundary lines, because the tips of adjacent unit pattern regions LT1 are in contact with each other, the projection image PRJ1 is less likely to be segmented into isolated strips, and because the unit pattern regions LT2 include sections of the circles that orthogonally intersect with the elongating direction of the projection image PRJ1, the outline of the projection image PRJ1 may be preserved to be in a recognizable state.

Also, it is noted that the higher the object OBJ1, the greater the elongation of the projection image PRJ1 in the direction away from the camera; and the greater the elongating distance away from the camera, the greater the degree of enlargement of the projection image PRJ1. However, because the unit pattern regions LT1 and LT2 are enlarged in proportion to the enlargement of the projection image PRJ1 their distance from the camera increases, the cutoff conditions of the projection image PRJ1 may be maintained substantially consistent.

Also, in FIG. 18A, the black portions of the dotted region representing the projection image PRJ2 represent portions overlapping with the unit pattern regions LT2 intersecting the nodal line NL (see FIG. 13), and the coordinates on the output image corresponding to these overlapping portions are associated with coordinates on the input image plane of the right side camera 2R (coordinates within a region forming the image of the object OBJ1).

On the other hand, the white portions of the dotted region representing the projection image PRJ2 represent portions overlapping with the unit pattern regions LT1 intersecting the antinodal line ANL (see FIG. 13), and the coordinates on the output image corresponding to these overlapping portions are associated with coordinates on the input image plane of the rear camera 2B (coordinates within a region that does not form the image of the object OBJ1).

Alternatively, the coordinates on the output image corresponding to the black portions of the dotted region representing the projection image PRJ2 may be associated with the coordinates of the input image plane of the rear camera 2B (coordinates within a region that does not form the image of the object OBJ1), and the coordinates on the output image corresponding to the white portions of the dotted region representing the projection image PRJ2 may be associated with the coordinates of the input image plane of the right side camera 2R (coordinates within a region forming the image of the object OBJ1).

As illustrated in FIG. 18B, although the projection image PRJ2 is cut off by the unit pattern regions LT1 that include sections of the circles orthogonally intersecting the elongating direction of the projection image PRJ2 (circles delineated by the peaks and troughs of the wave propagated from the position of the right side camera 2R) as boundary lines, because the tips of adjacent unit pattern regions LT2 are in contact with each other, the projection image PRJ2 is less likely to be segmented into isolated strips, and because the unit pattern regions LT1 include sections of the circles that orthogonally intersect with the elongating direction of the projection image PRJ2, the outline of the projection image PRJ2 may be preserved to be in a recognizable state.

Also, as with the projection image PRJ1, the higher the object OBJ1, the greater the elongation of the projection image PRJ2 in the direction away from the camera; and the greater the elongating distance away from the camera, the greater the degree of enlargement of the projection image PRJ2. However, because the unit pattern regions LT1 and LT2 are enlarged in proportion to the enlargement of the projection image PRJ2 as their distance from the camera increases, the cutoff conditions of the projection image PRJ2 may be maintained substantially consistent.

FIG. 19 shows the output image of FIG. 17 and an output image generated by applying the lattice pattern for bringing about a same color illusion on the output image of FIG. 17 to illustrate their difference. Specifically, the top image of FIG. 19 corresponds to the output image of FIG. 17, and the bottom image of FIG. 19 corresponds to the output image generated using the lattice pattern for bringing about a same color illusion.

As can be appreciated, the image of the person is missing from region R13 surrounded by a dot-dashed line in the top image of FIG. 19 that includes the boundary between a region of the output image based on the input image of the right side camera 2R and a region of the output image based on the input image of the rear camera 2B. However, the image of the person is not missing but is displayed in a recognizable state in region R14 surrounded by a dot-dashed line in the bottom image of FIG. 19 that has regions of the output image based on the input image of the right side camera 2R and regions of the output image based on the input image of the rear camera 2B arranged in a lattice pattern. Thus, an operator viewing the output image including the region R14 may become aware of the existence of the person.

According to an aspect of the present embodiment, by using the lattice pattern for bringing about a same color illusion upon generating an output image portion corresponding to an overlapping area of the image capturing ranges of two cameras, the image generation device 100 may prevent an image of an object located within the region corresponding to this output image portion from disappearing. Further, a projection image of the object that is to be cut off may be displayed in a more recognizable state to the operator compared to a case where two input images are composited by alternately arranging partial regions of the two input images in a comb-like pattern.

While certain preferred embodiments of the present invention have been described above, the present invention is not limited to these embodiments, and various variations and modifications may be made without departing from the scope of the present invention.

For example, although the image generation device 100 uses the cylindrical space model MD as a space model in the above-mentioned embodiments, the image generation device 100 may use a space model having other columnar shapes such as a polygonal column, etc., or may use a space model constituted by tow planes including a bottom surface and a side surface. Alternatively, the image generation device 100 may use a space model having only a side surface.

Also, the image generation device 100 described above is mounted together with cameras on a construction machine, which travels by itself and is equipped with movable members, such as a bucket, an arm, a boom, a turning mechanism, etc., and is incorporated into an operation support system which support a movement of the construction machine and operations of those movable members while presenting an image of surrounding areas to an operator. However, the image generation device 100 may also be mounted together with cameras on other construction machines (body to be operated), such as an industrial machine, a stationary crane, etc., which has a movable member but does not travel by itself, and may be incorporated into an operation support system which supports operations of the machine.

What is claimed is:

1. An image generation device that generates an output image including a road image based on plural input images that are captured by plural cameras mounted to a body to be operated, the image generation device comprising:
    a control part that alternately arranges input image portions of two cameras of the plural cameras that correspond to an overlapping area of image capturing ranges of the two cameras to form a lattice pattern on the output image; wherein
    the lattice pattern includes as a unit pattern a region that is defined by two circles having a center at a position of a first camera of the two cameras, and two circles having a center at a position of a second camera of the two cameras;
    the lattice pattern includes as the unit pattern a lattice defined by a circle delineated by a peak of a first wave from a first wave source located at the position of the first camera, a circle delineated by a trough of the first wave, a circle delineated by a peak of a second wave from a second wave source located at the position of the second camera, and a circle delineated by a trough of the second wave;
    the control part associates coordinates on an output image plane corresponding to the unit pattern that intersects an antinodal line formed by the first wave and the second wave with coordinates on a first input image plane of the first camera; and
    the control part associates coordinates on the output image plane corresponding to the unit pattern that intersects a nodal line formed by the first wave and the second wave with coordinates on a second input image plane of the second camera.

2. An operation support system that supports a movement or an operation of a body to be operated, comprising:
    an image generation device that generates an output image including a road image based on plural input images that are captured by plural cameras mounted to the body to be operated; and
    a display part that is installed in an operation cabin for moving or operating the body to be operated and is configured to display the output image generated by the image generation device; wherein
    the image generation device includes a control part that alternately arranges input image portions of two cameras of the plural cameras that correspond to an overlapping area of image capturing ranges of the two cameras to form a lattice pattern on the output image;
    the lattice pattern includes as a unit pattern a region that is defined by two circles having a center at a position of a first camera of the two cameras, and two circles having a center at a position of a second camera of the two cameras;
    the lattice pattern includes as the unit pattern a lattice defined by a circle delineated by a peak of a first wave from a first wave source located at the position of the first camera, a circle delineated by a trough of the first wave, a circle delineated by a peak of a second wave from a second wave source located at the position of the second camera, and a circle delineated by a trough of the second wave;
    the control part associates coordinates on an output image plane corresponding to the unit pattern that intersects an antinodal line formed by the first wave and the second wave with coordinates on a first input image plane of the first camera; and
    the control part associates coordinates on the output image plane corresponding to the unit pattern that intersects a nodal line formed by the first wave and the second wave with coordinates on a second input image plane of the second camera.

* * * * *